United States Patent
Hiruma et al.

(10) Patent No.: US 8,305,524 B2
(45) Date of Patent: Nov. 6, 2012

(54) LIQUID CRYSTAL DISPLAY POLARIZING PLATE, METHOD FOR PRODUCING LIQUID CRYSTAL DISPLAY POLARIZING PLATE, AND LIQUID CRYSTAL DISPLAY

(75) Inventors: Yusuke Hiruma, Tokyo-to (JP); Shoji Takeshige, Tokyo-to (JP); Keiji Kashima, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 261 days.

(21) Appl. No.: 12/667,723

(22) PCT Filed: Jul. 10, 2008

(86) PCT No.: PCT/JP2008/062472
§ 371 (c)(1),
(2), (4) Date: Jan. 5, 2010

(87) PCT Pub. No.: WO2009/008472
PCT Pub. Date: Jan. 15, 2009

(65) Prior Publication Data
US 2010/0328583 A1 Dec. 30, 2010

(30) Foreign Application Priority Data
Jul. 11, 2007 (JP) ................................. 2007-182206

(51) Int. Cl.
*G02F 1/1335* (2006.01)

(52) U.S. Cl. .......................................... 349/96; 349/117

(58) Field of Classification Search .................... 349/96, 349/117
See application file for complete search history.

(56) References Cited

U.S. PATENT DOCUMENTS 8,064,136 B2 * 11/2011 Kashima et al. ......... 359/489.01
2006/0033994 A1 * 2/2006 Li et al. ........................ 359/494

FOREIGN PATENT DOCUMENTS

| JP | 03-067219 A | 3/1991 |
| JP | 04-322223 A | 11/1992 |
| JP | 10-312166 A | 11/1998 |
| JP | 2002-267839 A | 9/2002 |
| JP | 2006-085098 A | 3/2006 |
| JP | 2006-091731 A | 4/2006 |
| JP | 2006-113500 A | 4/2006 |
| JP | 2006-221134 A | 8/2006 |

OTHER PUBLICATIONS

International Search Report: PCT/JP2008/062472.

* cited by examiner

*Primary Examiner* — Phu Vu
(74) *Attorney, Agent, or Firm* — Ladas & Parry LLP

(57) ABSTRACT

A liquid crystal display polarizing plate that can reliably exhibit optical properties and be bonded to a liquid crystal cell without causing degradation of the optical properties. The liquid crystal display polarizing plate includes: a retardation film which has a substrate including a cellulose derivative and a retardation layer formed directly on the substrate and containing the cellulose derivative and a rod-like compound having refractive index anisotropy; a polarizer bonded to the retardation layer of the retardation film and including polyvinyl alcohol; and a polarizing plate protection film bonded to the polarizer.

7 Claims, 6 Drawing Sheets

LIQUID CRYSTAL DISPLAY POLARIZING PLATE, METHOD FOR PRODUCING LIQUID CRYSTAL DISPLAY POLARIZING PLATE, AND LIQUID CRYSTAL DISPLAY

TECHNICAL FIELD

The invention mainly relates to a polarizing plate for use in a liquid crystal display and to a method for production thereof.

BACKGROUND ART

In recent years, liquid crystal displays have been rapidly spread in place of conventional CRT displays, because of their characteristics such as electric power saving, light weight and slimness. As shown in FIG. 9, for example, a general liquid crystal display typically comprises an input-side polarizing plate 102A, an output-side polarizing plate 102B, and a liquid crystal cell 101. In this structure, the polarizing plates 102A and 102B are each so configured that only linearly polarized light having a oscillation surface in a specific oscillation direction can be selectively transmitted, and placed opposite to each other in the crossed-Nicol arrangement so that the respective oscillation directions can be orthogonal to each other. The liquid crystal cell 101 includes a large number of cells corresponding to the pixels and is placed between the polarizing plates 102A and 102B.

Known examples of such a liquid crystal display utilize various driving modes depending on the alignment mode of the liquid crystalline material in the liquid crystal cell. The majority of currently popular liquid crystal displays are classified into TN, STN, VA, IPS, and OCB modes. In particular, VA-mode liquid crystal displays have become widely spread today.

However, liquid crystal displays have a specific problem such as the problem of viewing angle dependency due to the refractive index anisotropy of liquid crystal cells or polarizing plates. In the problem of viewing angle dependency, the image viewed in the front direction of a liquid crystal display differs in color or contrast from that viewed in oblique directions. The problem of viewing angle dependency has become more significant, as larger screen liquid crystal displays have been developed in recent years.

In order to reduce the problem of viewing angle dependency, various techniques have been developed to date. A typical one of such techniques utilizes a retardation film. In the method utilizing a retardation film as shown in FIG. 10, for example, retardation films 103 and 104 each having the desired optical properties are placed between a liquid crystal cell 101 and a polarizing plate 102A, between the liquid crystal cell 101 and a polarizing plate 102B, respectively, so that the problem of viewing angle dependency is reduced. This method has been widely used to produce liquid crystal displays with good viewing angle characteristics in a simple manner, because the problem of viewing angle dependency can be reduced only by incorporating a retardation film 103 into a liquid crystal display.

In a conventional technique as shown in FIG. 11, such a retardation film is generally configured to comprise a certain substrate 105, an alignment layer 106 provided thereon, and a retardation layer 107 that is formed on the alignment layer 106 and includes liquid crystal molecules, wherein the liquid crystal molecules are aligned by the alignment control force of the alignment layer so as to have the desired refractive index anisotropy. Known examples of such a retardation film include: a retardation film disclosed in Patent Document 1 or 2 which includes an alignment layer-carrying substrate and a retardation layer formed thereon and having a cholesterically ordered molecular structure (a birefringent retardation layer); and a retardation film disclosed in Patent Document 3 which includes an alignment layer-carrying substrate and a retardation layer formed thereon and including a disc-like compound (a birefringent retardation layer).

However, the retardation film having such a structure has a problem in which its retardation properties may change when it is used to form a liquid crystal display, although it has the advantage that it can exhibit excellent retardation properties, because liquid crystal molecules are used in it. Specifically, when a retardation film having the structure shown in FIG. 11 is used to form a liquid crystal display, the retardation film has to be bonded to a liquid crystal cell and a polarizing plate (or polarizer) with an adhesive. Therefore, a pressure-sensitive adhesive layer is essentially formed to bond the liquid crystal cell and the polarizing plate (or polarizer) to the retardation film. However, there is a problem in which the adhesive attached to the retardation layer containing a liquid crystalline material and the like may affect and disturb the alignment of liquid crystal molecules in the retardation layer, so that the optical properties of the retardation film may be degraded.

Patent Document 1: Japanese Patent Application Laid-Open (JP-A) No. 03-67219
Patent Document 2: JP-A No. 04-322223
Patent Document 3: JP-A No. 10-312166

DISCLOSURE OF THE INVENTION

In view of the above circumstances, the invention has been made, and a main object of the invention is to provide a liquid crystal display polarizing plate that can reliably exhibit optical properties and be bonded to a liquid crystal cell without causing degradation of the optical properties.

To achieve the object, the invention provides a liquid crystal display polarizing plate, comprising: a retardation film which further comprise a substrate including a cellulose derivative, and a retardation layer formed directly on the substrate and containing the cellulose derivative and a rod-like compound having refractive index anisotropy; a polarizer bonded to the retardation layer of the retardation film and including polyvinyl alcohol; and a polarizing plate protection film bonded to the polarizer.

According to the invention, the retardation layer side of the retardation film is bonded to the polarizer, and therefore the substrate side of the liquid crystal display polarizing plate of the invention can be bonded to a liquid crystal cell. Thus, even when a pressure-sensitive adhesive is used to bond the liquid crystal display polarizing plate of the invention to a liquid crystal cell, the adhesive does not affect or degrade the optical properties of the retardation layer.

In the liquid crystal display polarizing plate of the invention, the retardation layer contains a cellulose derivative. For example, therefore, the surface of the retardation layer may be alkali saponified so as to be hydrophilic, so that the retardation layer can be bonded to the polyvinyl alcohol-included polarizer without a pressure-sensitive adhesive. Hence, the optical properties of the retardation layer can be prevented from being degraded also in the process of manufacturing the liquid crystal display polarizing plate of the invention.

According to the invention, therefore, there is provided a liquid crystal display polarizing plate that can reliably exhibit optical properties and be bonded to a liquid crystal cell without causing degradation of the optical properties.

In an embodiment of the invention, an adhesive layer including a hydrophilic adhesive is preferably formed between the retardation film and the polarizer, so that the retardation film can be more strongly bonded to the polarizer. In addition, when the hydrophilic adhesive is used, the retardation film can be bonded to the polarizer without causing degradation of the optical properties of the retardation film.

In an embodiment of the invention, a pressure-sensitive adhesive layer containing an acrylic pressure-sensitive adhesive may be formed on the substrate of the retardation film. When such a pressure-sensitive adhesive layer is formed, the liquid crystal display polarizing plate of the invention can be easily bonded to a liquid crystal cell in the process of manufacturing a liquid crystal display with the liquid crystal display polarizing plate of the invention.

In an embodiment of the invention, the rod-like compound is preferably in random homogeneous alignment. In this case, the retardation film used in the invention has the property of optically serving as a negative C plate, so that the liquid crystal display retardation film of the invention can more reliably exhibit optical properties.

The invention also provides a method for producing a liquid crystal display polarizing plate, comprising the steps of: a retardation film forming step for forming a retardation film which comprises a substrate, and a retardation layer formed on the substrate and containing a cellulose derivative and a rod-like compound, by using the substrate including the cellulose derivative and applying, directly to the substrate, a retardation layer-forming coating solution containing the rod-like compound which has refractive index anisotropy to form the retardation layer; a hydrophilic treatment step of hydrophilizing the surface of the retardation layer of the retardation film; and a polarizer bonding step of bonding a polarizer including polyvinyl alcohol to the hydrophilized retardation layer.

According to the invention, the hydrophilic treatment step of hydrophilizing the retardation layer is followed by the step of bonding a polarizer to the hydrophilized retardation layer in the polarizer bonding step, so that the polarizer can be bonded to the retardation layer without causing degradation of the optical properties of the retardation layer. When a liquid crystal display is manufactured using the liquid crystal display polarizing plate produced according to the invention, the substrate of the retardation film and a liquid crystal cell may be bonded together with a pressure-sensitive adhesive, so that the liquid crystal display polarizing plate and the liquid crystal cell can be bonded without causing degradation of the optical properties.

According to the invention, therefore, a liquid crystal display polarizing plate that reliably exhibits the optical properties and can be bonded to a liquid crystal cell without causing degradation of the optical properties is produced.

In the method for producing a liquid crystal display polarizing plate of the invention, the hydrophilic treatment step is preferably a step of hydrophilizing the surface of the retardation layer by alkali saponifying the cellulose derivative contained in the retardation layer. Thereby, the surface of the retardation layer can be hydrophilized without causing degradation of the optical properties of the retardation layer in the hydrophilic treatment step.

The invention also provides a liquid crystal display, comprising: a liquid crystal cell; and the liquid crystal display polarizing plate according an embodiment of the present invention placed on at least one side of the liquid crystal cell, wherein the liquid crystal cell and the substrate of the liquid crystal display polarizing plate are bonded together with a pressure-sensitive adhesive layer containing a pressure-sensitive adhesive.

According to the invention, the substrate side of the liquid crystal display polarizing plate is bonded to a liquid crystal cell. Therefore, the liquid crystal display polarizing plate can be bonded to the liquid crystal cell without causing degradation of the optical properties of the retardation film in the process of manufacturing the liquid crystal display according to the invention. According to the invention, therefore, the optical properties of the carefully designed retardation film are preserved in the process of bonding the liquid crystal display polarizing plate to the liquid crystal cell, so that a liquid crystal display with excellent viewing angle characteristics is obtained.

EFFECT OF THE INVENTION

The invention provides the advantage that a liquid crystal display polarizing plate that reliably exhibits optical properties and can be bonded to a liquid crystal cell without causing degradation of the optical properties is obtained.

Figure 1:
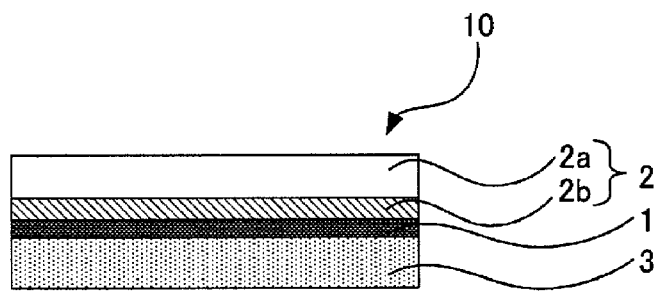
FIG. 1 is a schematic cross-sectional view showing an example of the liquid crystal display polarizing plate of the invention.

DESCRIPTION OF REFERENCE CHARACTERS 1 polarizer
2 retardation film
2a substrate
2b retardation layer
3 polarizing plate protection film
4 adhesive layer
5, 22 pressure-sensitive adhesive layer
10, 10' and 10" liquid crystal display polarizing plate
20 liquid crystal display
21 liquid crystal cell
23 polarizing plate
101 liquid crystal cell 102A, 102B polarizing plate
103, 104 retardation film
105 substrate
106 alignment layer
107 retardation layer
A rod-like compound

BEST MODE FOR CARRYING OUT THE INVENTION

The invention relates to a liquid crystal display polarizing plate for use in liquid crystal displays, a method for producing the liquid crystal display polarizing plate, and a liquid crystal display.

They are described one by one below.

A. Liquid Crystal Display Polarizing Plate

First, an explanation is given of the liquid crystal display polarizing plate of the invention. As stated above, the liquid crystal display polarizing plate of the invention comprises: a retardation film which further comprises a substrate including a cellulose derivative and a retardation layer formed on the substrate and containing the cellulose derivative and a rod-like compound having refractive index anisotropy; a polarizer bonded to the retardation layer of the retardation film and made of polyvinyl alcohol; and a polarizing plate protection film bonded to the polarizer.

The liquid crystal display polarizing plate of the invention is explained with reference to the drawings. FIG. 1 is a schematic cross-sectional view showing an example of the liquid crystal display polarizing plate of the invention. In an embodiment of the invention as illustrated in FIG. 1, a liquid crystal display polarizing plate 10 includes a polarizer 1, a retardation film 2 bonded to one side of the polarizer 1, and a polarizing plate protection film 3 bonded to the other side of the polarizer 1.

In such an embodiment of the invention, the liquid crystal display polarizing plate 10 is characterized in that the retardation film 2 has: a substrate 2a made of a cellulose derivative, and a retardation layer 2b formed on the substrate 2a and containing a rod-like compound having refractive index anisotropy and the cellulose derivative, which also forms the substrate 2a, and that the retardation layer 2b side of the retardation film 2 is bonded to the polarizer 1.

According to the invention, the retardation layer side of the retardation film is bonded to the polarizer, and therefore the substrate side of the liquid crystal display polarizing plate of the invention can be bonded to a liquid crystal cell. Thus, even when a pressure-sensitive adhesive is used to bond the liquid crystal display polarizing plate of the invention to a liquid crystal cell, the adhesive does not affect or degrade the optical properties of the retardation layer.

In the liquid crystal display polarizing plate of the invention, the retardation layer contains a cellulose derivative. For example, therefore, the surface of the retardation layer may be alkali saponified so as to be hydrophilic, so that the retardation layer can be bonded to the polyvinyl alcohol polarizer without any pressure-sensitive adhesive. Hence, the optical properties of the retardation layer can be prevented from being degraded also in the process of manufacturing the liquid crystal display polarizing plate of the invention.

The liquid crystal display polarizing plate of the invention also has the advantage that the optical properties of the retardation layer is less likely to fluctuate, because the retardation layer side of the retardation film is bonded to the polarizer.

According to the invention, therefore, there is provided a liquid crystal display polarizing plate that can reliably exhibit optical properties and be bonded to a liquid crystal cell without causing degradation of the optical properties.

The liquid crystal display polarizing plate of the invention includes at least the retardation film, the polarizer and the polarizing plate protection film and optionally other components.

The respective elements that may be used to form the liquid crystal display polarizing plate of the invention are described one by one below.

1. Retardation Film

First, an explanation is given on the retardation film for use in the invention. The retardation film for use in the invention includes a substrate and a retardation layer formed on the substrate.

(1) Retardation Layer

The retardation layer for use in the invention is directly formed on the substrate described below and contains a cellulose derivative, which also forms the substrate, and a rod-like compound having refractive index anisotropy.

a. Rod-Like Compound

The rod-like compound for use in the invention has refractive index anisotropy. It may be of any type that allows the desired optical properties to be imparted to the retardation layer, when it is aligned in the retardation layer.

As used herein, the term "rod-like compound" means a compound whose molecular structure has a rod-like main skeleton.

In the invention, the "rod-like compound" refers to a compound whose molecular structure has a rod-like main skeleton. Examples of compounds having such a rod-like main skeleton include azomethines, azoxys, cyanobiphenyls, cyanophenyl esters, benzoic esters, phenyl esters of cyclohexanecarboxylic acid, cyanophenylcyclohexanes, cyano-substituted phenylpyrimidines, alkoxy-substituted phenylpyrimidines, phenyldioxanes, tolans, and alkenylcyclohexylbenzonitriles. Not only the above low-molecular-weight liquid crystalline compounds but also high-molecular-weight liquid crystalline compounds may be used.

In the invention, any of the rod-like compounds belonging to the above groups may be conveniently used, and in particular, the rod-like compound preferably has a rod-like main skeleton in which two or more benzene rings are linked, specifically in which two or more benzene rings are linked by an ester bond. The rod-like compound having such a structure has high intramolecular refractive-index anisotropy, so that it can impart high retardation properties to the retardation layer, when it is aligned in the retardation layer.

The rod-like compound for use in the invention preferably has a relatively low molecular weight. More specifically, the compound to be used preferably has a molecular weight in the range of 200 to 1,200, particularly in the range of 400 to 1,000. This is because when the rod-like compound with such a relatively low molecular weight is used in the retardation layer according to the invention, which contains the rod-like compound and the cellulose derivative also forming the substrate described below, the rod-like compound is easily mixed with the cellulose derivative in the retardation layer, so that the retardation layer has improved adhesion to the substrate.

When the rod-like compound used is a material having a polymerizable functional group, the molecular weight of the rod-like compound refers to the molecular weight of the monomer before the polymerization.

The rod-like compound for use in the invention is also preferably a liquid crystalline material having liquid crystal properties. Liquid crystalline materials have the property of being regularly aligned and therefore have a relatively high birefringence Δn (nx−ny) and can easily impart the desired retardation properties to the retardation layer.

A material exhibiting any liquid crystal phase such as a nematic phase, a cholesteric phase, or a smectic phase is preferably used as the liquid crystalline material. Specifically, in the invention, a liquid crystalline material exhibiting a nematic phase is preferably used. This is because a liquid crystalline material exhibiting a nematic phase can be easily aligned in a regular manner, as compared with liquid crystalline materials exhibiting any other liquid crystal phase.

A material having spacers at both ends of the mesogen is preferably used as the liquid crystalline material exhibiting a nematic phase, because the liquid crystalline material having spacers at both ends of the mesogen is highly flexible and therefore can be used to form a highly transparent retardation film for the invention.

The rod-like compound for use in the invention preferably has a polymerizable functional group in the molecule, specifically a three-dimensionally cross-linkable polymerizable functional group in the molecule. The rod-like compound having a polymerizable functional group can be fixed by the polymerization of the rod-like compound, so that it can form a retardation layer which has high alignment stability and whose retardation properties are less likely to change over time.

In the invention, the rod-like compound having the polymerizable functional group may be mixed with a rod-like compound having no polymerizable functional group.

The term "three-dimensionally cross-linkable" means that the liquid crystalline molecules can be three-dimensionally polymerized to form a mesh (network) structure.

Examples of the polymerizable functional group include polymerizable functional groups that can be polymerized by the action of ultraviolet rays or ionizing radiations such as electron beams or by the action of heat. Typical examples of such polymerizable functional groups include radically polymerizable functional groups and cationically polymerizable functional groups. Typical examples of radically polymerizable functional groups include functional groups having at least one addition-polymerizable ethylenic unsaturated double bond, and specific examples include a substituted or unsubstituted vinyl group and a substituted or unsubstituted acrylate group (a generic name encompassing acryloyl, methacryloyl, acryloyloxy, and methacryloyloxy groups). Specifically, the cationically polymerizable functional group may be an epoxy group or the like. Other polymerizable functional groups include an isocyanate group, an unsaturated triple bond, and the like. In particular, a functional group having an ethylenic unsaturated double bond is preferably used in view of the process involved.

More preferably, the rod-like compound for use in the invention is a liquid crystalline material exhibiting liquid crystal properties and having the polymerizable functional group at its end. For example, such a liquid crystalline material used can be three-dimensionally polymerized to form a mesh (network) structure, so that it can form a retardation layer having alignment stability and capable of reliably exhibiting optical properties.

In the invention, even when the liquid crystalline material used has a polymerizable functional group at one end, it may be crosslinked with any other molecule so that its alignment can be stabilized.

More specifically, examples of the rod-like compound for use in the invention include compounds represented by each of formulae (1) to (6) below.

[Chemical Formula 1]

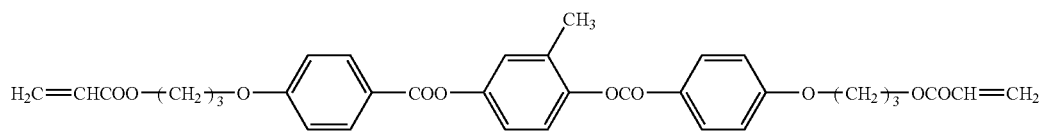

(1)

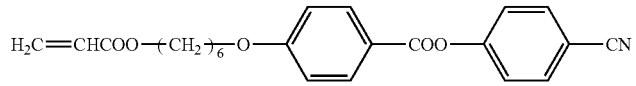

(2)

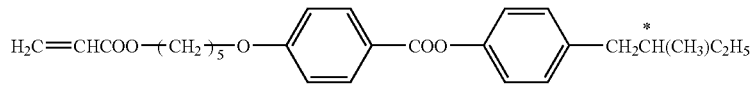

(3)

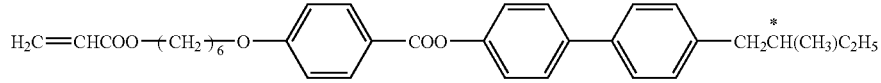

(4)

(5)

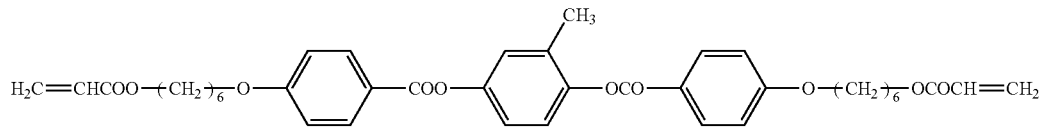

(6)

The liquid crystalline materials represented by formulae (1), (2), (5), and (6), respectively, may be prepared according to or similarly to the method disclosed in D. J. Broer et al., Makromol. Chem. 190, 3201-3215 (1989) or D. J. Broer et al., Makromol. Chem. 190, 2250 (1989). The preparation of the liquid crystalline materials represented by formulae (3) and (4), respectively, is disclosed in DE 195,04,224.

More specifically, examples of the nematic liquid crystalline material having an acrylate group at its end include those represented by each of formulae (7) to (17) below.

Only one type of liquid crystalline material may be used in the invention, or two or more types of liquid crystalline materials may be used in the invention. For example, the liquid crystalline material is preferably used in the form of a mixture of a liquid crystalline material having one or more polymerizable functional groups at both ends and another liquid crystalline material having one or more polymerizable functional groups at one end, so that the polymerization density (crosslink density) and the optical properties can be arbitrary controlled by controlling the mixing ratio between them.

[Chemical Formula 2]

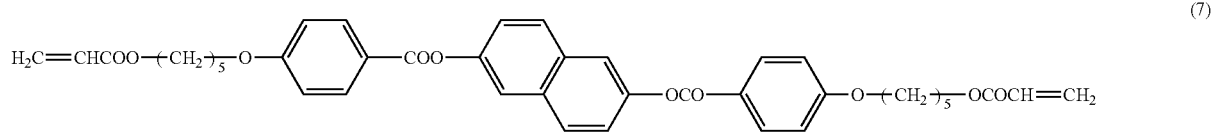

(7)

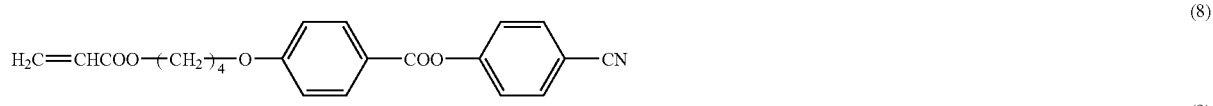

(8)

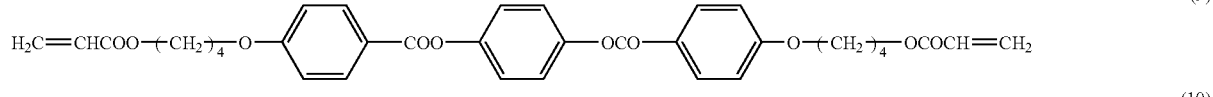

(9)

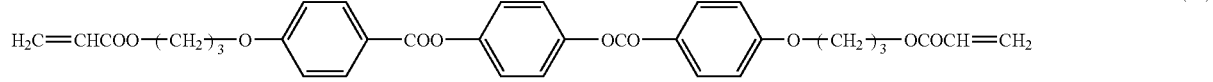

(10)

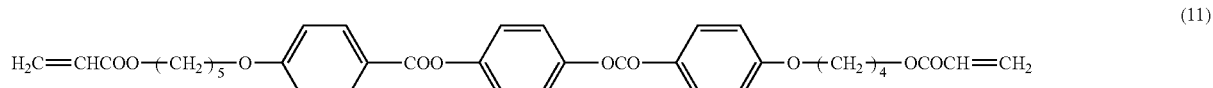

(11)

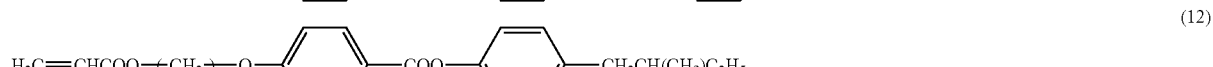

(12)

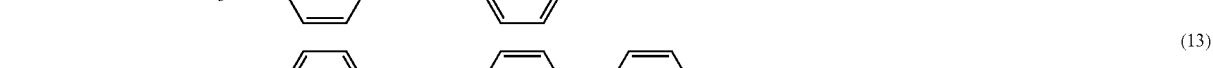

(13)

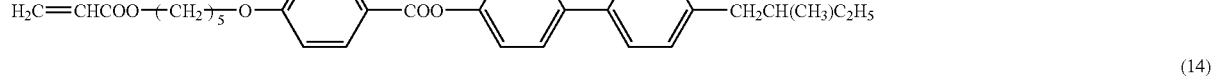

(14)

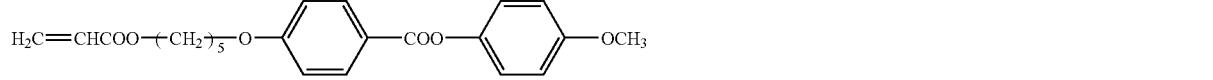

(15)

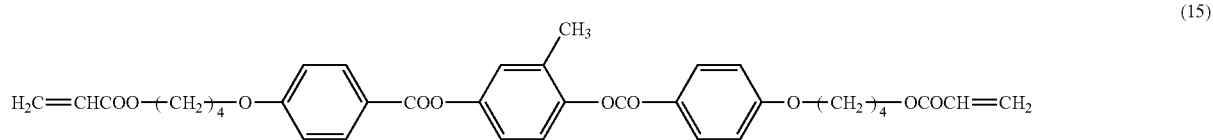

(16)

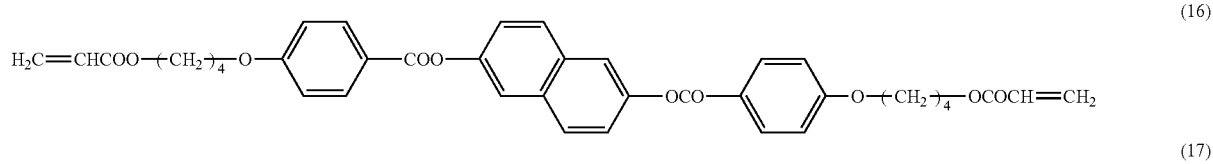

(17)

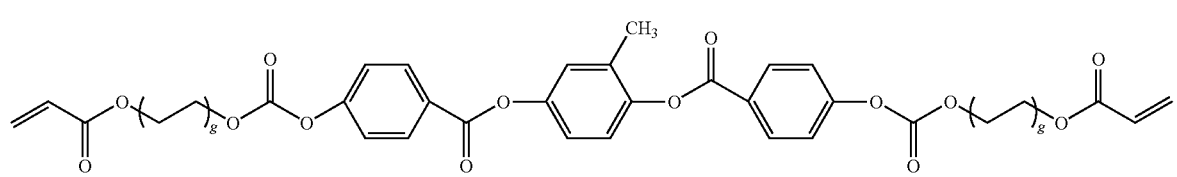

g: integer of 2 to 5 b. Rod-Like Compound Alignment Mode

Next, an explanation is given on the mode of the alignment of the rod-like compound in the retardation layer according to the invention. The mode of the alignment of the rod-like compound may be of any type that allows the desired optical properties to be imparted to the retardation film for use in the invention. Examples of such an alignment mode include a mode in which the rod-like compound is regularly aligned in a single direction, a cholesteric alignment mode, a hybrid alignment mode, a random homogeneous alignment mode, and the like. Specifically, in the invention, the rod-like compound is preferably in random homogeneous alignment, so that a highly transparent retardation film in which the retardation layer is prevented from having cloudiness or the like can be obtained.

Such random homogeneous alignment is further explained below.

The random homogeneous alignment is characterized at least in that domains formed by molecules of the rod-like compound in the retardation layer are each smaller in size than a wavelength in the visible light range (hereinafter, such a feature may be simply referred to as "dispersibility") and that molecules of the rod-like compound in the retardation layer are present in a plane parallel to the surface of the retardation layer (hereinafter, such a feature may be simply referred to as "in-plane alignment").

Figure 2:
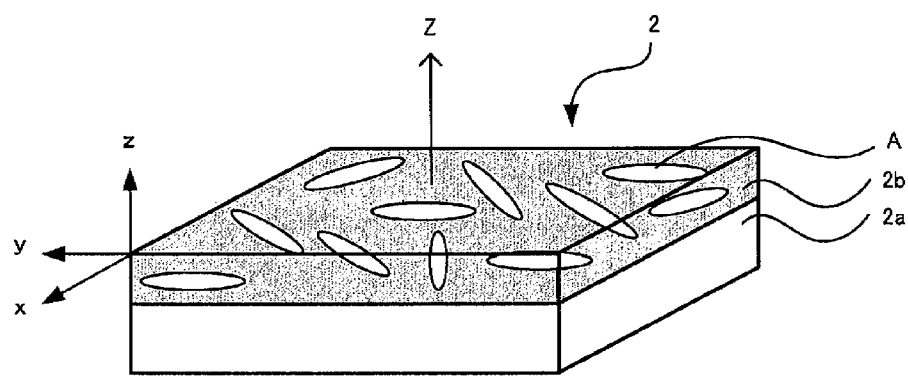
FIG. 2 is a schematic perspective view showing an example of the retardation film for use in the invention.
Figure 3A:
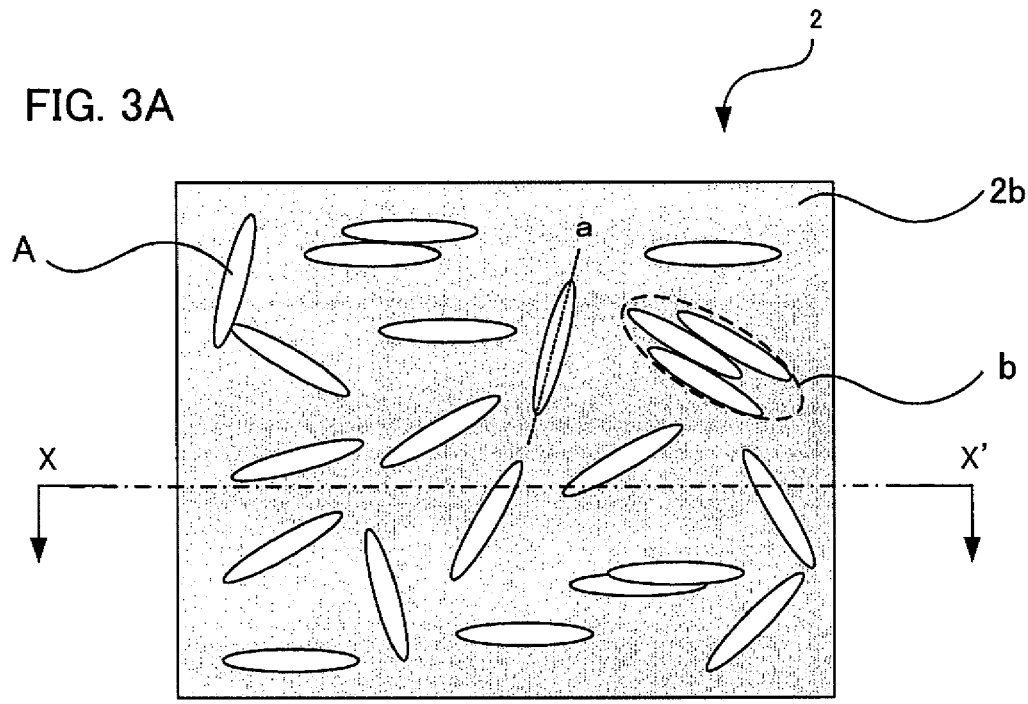
FIGS. 3A to 3C are each a schematic diagram showing an example of the retardation film for use in the invention.
Figure 3B:
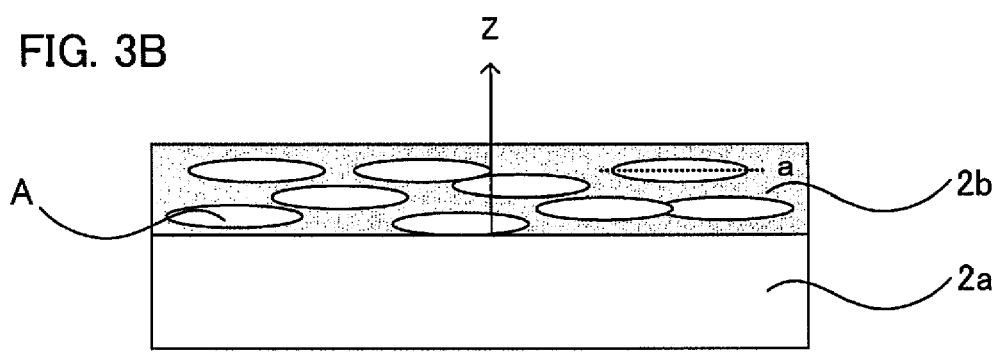
Figure 3C:
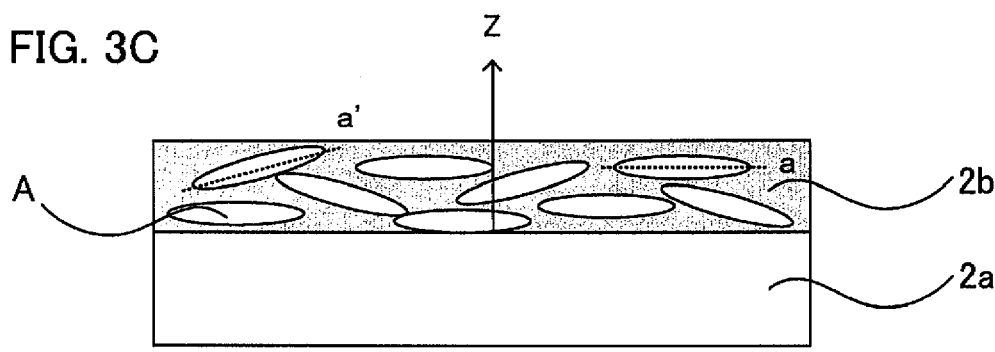

Such random homogeneous alignment will be explained with reference to the drawings. FIG. 2 is a schematic perspective view showing an example of the retardation film for use in the invention, and FIG. 3A is a schematic diagram showing a retardation film for use in the invention as described above, which is viewed in the normal direction of the retardation film, indicated by Z in FIG. 2. FIGS. 3B and 3C are each a cross-sectional view taken along the line X-X' in FIG. 3A.

First, the "dispersibility" satisfied by the random homogeneous alignment according to the invention is explained with reference to FIG. 3A. As shown in FIG. 3A, the "dispersibility" means that when a rod-like compound A forms a domain "b" in a retardation layer 2b, the domain "b" is smaller in size than a wavelength in the visible light range. In the invention, the size of the domain "b" is preferably as small as possible, and most preferably, the rod-like compound is dispersed in the form of a single molecule without forming a domain.

Next, the "in-plane alignment" satisfied by the random homogeneous alignment is explained with reference to FIG. 3B. As shown in FIG. 3B, the "in-plane alignment" means that the rod-like compound A in the retardation layer 2b is so aligned that the molecular axis "a" is aligned substantially perpendicular to the normal direction Z of the retardation layer 2b. As used herein, the term "in-plane alignment" is intended to include not only the case where, as shown in FIG. 3B, the molecular axes "a" of all the rod-like compound A in the retardation layer 2b are substantially perpendicular to the normal direction Z but also the case where, typically as shown in FIG. 3C, the average direction of the molecular axes "a" of the rod-like compound A in the retardation layer 2b is substantially perpendicular to the normal direction Z, even though the rod-like compound A in the retardation layer 2b each have a molecular axis "a'" not perpendicular to the normal direction Z.

Next, an explanation is given on methods for confirming that the rod-like compound in the retardation layer has such "dispersibility" and such an "in-plane alignment."

First, a method for confirming the "dispersibility" satisfied by the random homogeneous alignment according to the invention is explained below. The "dispersibility" may be confirmed by the fact that the haze of the retardation layer is in a range which indicates that the size of the domain of the rod-like compound is smaller than a wavelength in the visible light range. Specifically, in the invention, the retardation layer preferably has a haze of 0.1% to 1%.

The value measured according to JIS K7105 may be used as the haze.

In this regard, the haze of the retardation layer may be determined by the measurement basically only on the retardation layer. In many practical cases, however, the retardation layer is thin and strongly bonded to the substrate, and therefore, it is often difficult to separate only the retardation layer for the measurement. In general, therefore, the haze of the retardation layer is determined by subtracting the haze of the layer(s) other than the retardation layer from the haze of the entire retardation film. Specifically, the haze of the retardation layer may be determined by a process including measuring the haze of the entire retardation film, removing the retardation layer from the retardation film, measuring the haze of the remainder, and subtracting the latter haze from the former haze. The value measured according to JIS K7105 may be used as the haze.

Next, an explanation is given of a method for confirming the "in-plane alignment" satisfied by the random homogeneous alignment according to the invention. The "in-plane alignment" may be confirmed by the fact that the retardation layer has a retardation (Rth) in the thickness direction, which indicates the property of optically serving as a negative C plate. As used herein, the phrase "indicates the property of serving as a negative C plate" means that the retardation (Rth) in the thickness direction is 50 nm or more. Specifically, in the invention, the retardation layer preferably has a retardation (Rth) of 50 nm to 300 nm in the thickness direction.

The retardation (Rth) in the thickness direction is expressed by the formula $Rth=\{(nx+ny)/2-nz\} \times d$, wherein "nx" is the refractive index in the in-plane fast axis direction (where the refractive index is minimum) of the retardation layer as a component of the retardation film according to the invention, "ny" is the refractive index in the in-plane slow axis direction (where the refractive index is maximum) of the retardation layer, "nz" is the refractive index in the thickness direction of the retardation layer, and "d (nm)" is the thickness of the retardation layer. As used herein, Rth refers to the absolute value of the value calculated by the above formula.

The retardation (Rth) in the thickness direction (the thickness direction retardation (Rth)) of the retardation layer may be determined by the measurement basically only on the retardation layer. In many practical cases, however, the retardation layer is thin and strongly bonded to the substrate, and therefore, it is often difficult to separate only the retardation layer for the measurement. In general, therefore, the thickness direction retardation (Rth) of the retardation layer is determined by subtracting the thickness direction retardation (Rth) of the layer(s) other than the retardation layer from the thickness direction retardation (Rth) of the entire retardation film. Specifically, the thickness direction retardation (Rth) of the retardation layer may be determined by a process including measuring the thickness direction retardation (Rth) of the entire retardation film, removing the retardation layer from the retardation film, measuring the thickness direction retardation (Rth) of the remainder, and subtracting the latter measurement from the former measurement. For example, the thickness direction retardation (Rth) may be measured by a parallel-Nicol rotation method using KOBRA-WR® manufactured by Oji Scientific Instruments.

When the rod-like compound used has a rod-like skeleton in which two or more benzene rings are linked, the "in-plane alignment" may be confirmed by the measurement of the Raman peak intensity ratio (1,605 cm$^{-1}$/2,942 cm$^{-1}$) in the thickness direction of the retardation layer. Specifically, the presence of the "in-plane alignment" may be confirmed by the fact that the Raman peak intensity ratio (1,605 cm$^{-1}$/2,942 cm$^{-1}$) of the retardation layer is higher in a direction perpendicular to the thickness direction of a cross-section cut in the thickness direction of the retardation layer than in a direction parallel to the thickness direction. In the invention, the Raman peak intensity ratio (1,605 cm$^{-1}$/2,942 cm$^{-1}$) of the retardation layer is preferably 1.1 times or more higher in a direction perpendicular to the thickness direction of a cross-section cut in the thickness direction of the retardation layer than in a direction parallel to the thickness direction, so that the optically functional layer according to the invention reliably exhibits a retardation (Rth) in the thickness direction.

In the invention, the Raman peak intensity ratio (1,605 cm$^{-1}$/2,942 cm$^{-1}$) may be typically determined by a process including measuring the Raman spectrum of the retardation layer with a laser Raman spectrometer (NRS-3000® manufactured by JASCO Corporation) in each of directions parallel and perpendicular to the thickness direction of the cross-section cut in the thickness direction of the retardation layer, while introducing the measurement light so that the electric field oscillation surface for linearly polarized light can be aligned with each of directions parallel and perpendicular to the thickness direction of the cross-section, and then evaluating the intensity of a peak at 1,605 cm$^{-1}$ (peak derived from a C—H bond) and the intensity of a peak at 2,942 cm$^{-1}$ (peak derived from a benzene ring). The conditions of the Raman spectrum measurement using the laser Raman spectrometer include an exposure time of 15 seconds, a cumulated number of 8, and an excitation wavelength of 532.11 nm.

For example, the Raman peak intensity ratio of the retardation layer may be determined by a process including cutting the retardation film in the thickness direction to form a section and then measuring the Raman spectrum of only a portion corresponding to the retardation layer.

When the rod-like compound is in the random homogeneous alignment, the retardation film for use in the invention has at least the property of optically serving as a negative C plate. In addition, the retardation film can also have the property of optically serving as an A plate, when the alignment order of the rod-like compound in the retardation layer is controlled for the optical properties of the retardation film (hereinafter, having both the property of optically serving as an A plate and the property of optically serving as a C plate may be simply referred to as "having the property of optically serving as a B plate.")

More specifically, when the rod-like compound is randomly aligned in the plane of the retardation layer (hereinafter, such a case may be referred to as "isotropy"), the retardation layer has only the property of optically serving as a negative C plate. On the other hand, when the rod-like compound is so aligned in the plane of the retardation layer that the molecular axes are averagely oriented in a single direction (hereinafter, such as case may be referred to as "anisotropy"), the retardation layer has the property of optically serving as a B plate.

When the rod-like compound is in random homogeneous alignment as described above, the property of optically serving as an A plate can be imparted to any arbitrary extent by making the order of the rod-like compound "isotropic" or "anisotropic" and by controlling the degree of the "anisotropy" (in the case that it is made "anisotropic"), while the property of optically serving as a negative C plate is maintained.

The "isotropy" and the "anisotropy" are each explained below.

The "isotropy" is first explained. As stated above, the "isotropy" according to the invention means that the rod-like compound is randomly aligned in the retardation layer.

The "isotropy" of the rod-like compound is explained with reference to FIGS. 3A to 3C. As illustrated in FIG. 3A, the "isotropy" indicates that the rod-like compound A is randomly aligned in the retardation layer 2b. In this regard, the direction of the alignment of the rod-like compound A is considered and explained on the basis of the direction of the long molecular axis represented by the character "a" in FIG. 3A (hereinafter, referred to as "molecular axis"). Therefore, the fact that the rod-like compound A is aligned in random directions means that the molecular axes "a" of the rod-like compound A in the retardation layer 2b are randomly aligned.

Besides the alignment state illustrated in FIG. 3A, the case where the rod-like compound has a cholesteric structure may superficially correspond to the "isotropy," because the directions of the molecular axes are totally random. However, the "isotropy" according to the invention is not intended to include the state caused by such a cholesteric structure.

The fact that the rod-like compound for use in the invention has the "isotropy" may be confirmed by the evaluation of the in-plane retardation (Re) of the retardation layer and by the evaluation of the presence or absence of a selective-reflection wavelength attributable to a cholesteric structure. The random alignment of the rod-like compound can be confirmed by the evaluation of the in-plane retardation (Re) of the retardation layer, and the fact that the rod-like compound does not form any cholesteric structure can be confirmed by determining the presence or absence of a selective-reflection wavelength.

The random alignment of the rod-like compound may be confirmed by the fact that the value of the in-plane retardation (Re) is in a range that indicates that the rod-like compound is randomly aligned. Specifically, in the invention, the retardation layer preferably has an in-plane retardation (Re) of 0 nm to 5 nm.

The in-plane retardation (Re) of the retardation layer may be determined by the measurement basically only on the retardation layer. In many practical cases, however, the retardation layer is thin and strongly bonded to the substrate, and therefore, it is often difficult to separate only the retardation layer for the measurement. In general, therefore, the in-plane retardation (Re) of the retardation layer is determined by subtracting the in-plane retardation (Re) of the layer(s) other than the retardation layer from the in-plane retardation (Re) of the entire retardation film. Specifically, the in-plane retardation (Re) of the retardation layer may be determined by a process including measuring the in-plane retardation (Re) of the entire retardation film, removing the retardation layer from the retardation film, measuring the in-plane retardation (Re) of the remainder, and subtracting the latter measurement from the former measurement. For example, the in-plane retardation (Re) may be measured by a parallel-Nicol rotation method using KOBRA-WR® manufactured by Oji Scientific Instruments.

For example, the rod-like compound having no cholesteric structure may be evaluated by confirming, with an ultraviolet-visible-near infrared spectrophotometer manufactured by Shimadzu Corporation (such as UV-3100®), that the retardation layer according to the invention does not have any selective-reflection wavelength. The rod-like compound having a cholesteric structure is characterized by having a selective-reflection wavelength depending on the spiral pitch of the cholesteric structure.

Next, the "anisotropy" is explained below. As stated above, the "anisotropy" according to the invention means that the molecular axes of the rod-like compound in the retardation layer are averagely aligned in a single direction.

Figure 4:
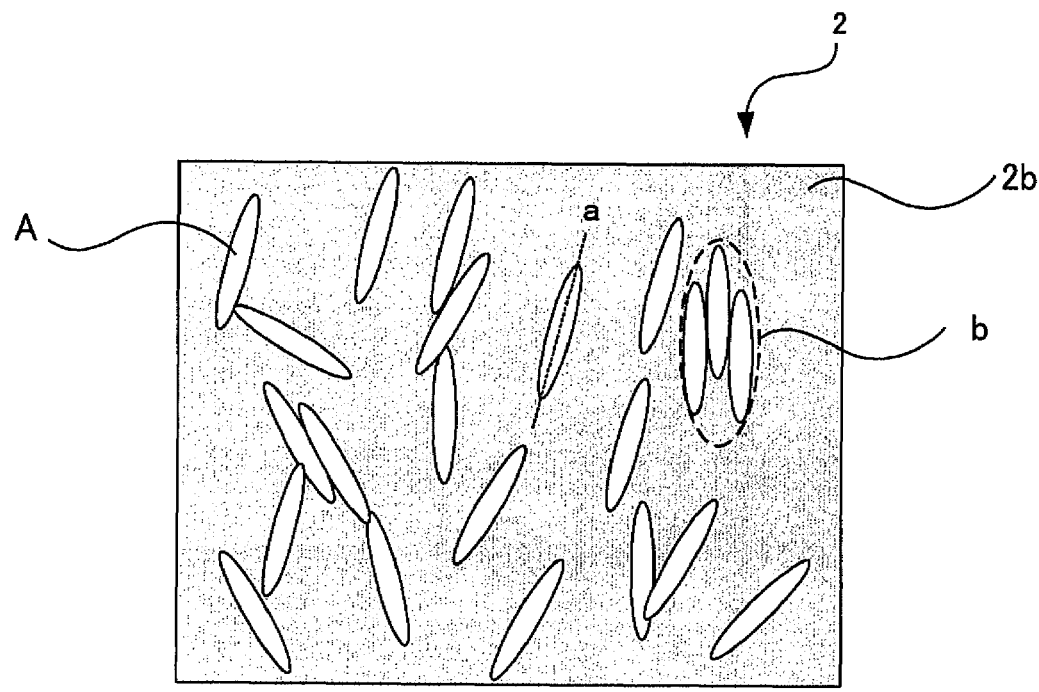
FIG. 4 is a schematic diagram showing another example of the retardation film for use in the invention.

Such "isotropy" is explained with reference to FIG. 4. As illustrated in FIG. 4, the "anisotropy" indicates that the rod-like compound A in the retardation layer 2b are averagely aligned in a single direction, when the retardation film is viewed in a direction normal to the surface of the retardation layer 2b.

The "anisotropy" of the rod-like compound may be confirmed by evaluating whether the in-plane retardation (Re) of the retardation layer indicates that the retardation layer has the property of optically serving as an A plate. As used herein, the phrase "has the property of optically serving as an A plate" means that the in-plane retardation (Re) is 5 nm or more. Specifically, in the invention, the in-plane retardation (Re) of the retardation layer is preferably in the range of 5 nm to 300 nm, more preferably in the range of 10 nm to 200 nm, particularly preferably in the range of 40 nm to 150 nm.

When the rod-like compound used has a rod-like main skeleton in which two or more benzene rings are linked, the "isotropy" and the "anisotropy" may be confirmed by the measurement of the Raman peak intensity ratio (1,605 cm$^{-1}$/2,942 cm$^{-1}$) in the in-plane direction of the retardation layer.

Specifically, the presence of the "anisotropy" may be confirmed by the fact that the Raman peak intensity ratio (1,605 cm$^{-1}$/2,942 cm$^{-1}$) of the retardation layer according to the invention is higher in the in-plane slow axis direction of the retardation layer than in the in-plane fast axis direction of the retardation layer. Specifically, in the invention, the Raman peak intensity ratio (1,605 cm$^{-1}$/2,942 cm$^{-1}$) is preferably 1.1 times or more higher in the in-plane slow axis direction of the retardation layer than in the in-plane fast axis direction of the retardation layer, so that the optically functional layer according to the invention reliably exhibits a retardation (Re) in the in-plane direction. On the other hand, the presence of the "isotropy" may be confirmed by the fact that the Raman peak intensity ratio (1,605 cm$^{-1}$/2,942 cm$^{-1}$) in the in-plane slow axis direction of the retardation layer according to the invention is substantially equal to the Raman peak intensity ratio (1,605 cm$^{-1}$/2,942 cm$^{-1}$) in the in-plane fast axis direction of the retardation layer.

In the invention, the Raman peak intensity ratio (1,605 cm$^{-1}$/2,942 cm$^{-1}$) may be, for example, determined by a process including measuring the Raman spectrum of the retardation layer with a laser Raman spectrometer (NRS-3000® manufactured by JASCO Corporation) in each of the in-plane slow axis direction and the in-plane fast axis direction, while introducing the measurement light so that the electric field oscillation surface for linearly polarized light can be aligned with each of the in-plane slow axis direction and the in-plane fast axis direction of the retardation layer, and then evaluating the intensity of a peak at 1,605 cm$^{-1}$ (peak derived from a C—H bond) and the intensity of a peak at 2,942 cm$^{-1}$ (peak derived from a benzene ring). The conditions of the Raman spectrum measurement using the laser Raman spectrometer include an exposure time of 15 seconds, a cumulated number of 8, and an excitation wavelength of 532.11 nm.

The Raman peak intensity ratio of the retardation layer may be, for example, determined by subtracting the Raman peak intensity ratio of the layer(s) other than the retardation layer from the Raman peak intensity ratio of the entire retardation film. Specifically, the Raman peak intensity ratio of the retardation layer may be determined by a process including measuring the Raman peak intensity ratio of the entire retardation film, removing the retardation layer from the retardation film, measuring the Raman peak intensity ratio of the remainder, and subtracting the latter measurement from the former measurement.

c. Cellulose Derivative

Next, an explanation is given on the cellulose derivative contained in the retardation layer. The cellulose derivative contained in the retardation layer also forms the substrate explained below. In the invention, such a cellulose derivative is contained in the retardation layer, so that the resulting retardation film has good adhesion between the substrate and the retardation layer.

In the invention, the content of the cellulose derivative contained in the retardation layer is not restricted as long as adhesion between the substrate and the retardation layer and between the retardation layer and the polarizer can be kept in a desired range in the retardation film for use in the invention. Specifically, in the invention, the cellulose derivative content is preferably from 1 to 50% by mass, particularly preferably from 5 to 30% by mass.

The cellulose derivative contained in the retardation layer is the same as that explained below in the section "(2) Substrate," and therefore a detailed description thereof is omitted here.

d. Retardation Layer

The retardation layer for use in the invention may contain an additional compound other than the rod-like compound and the cellulose derivative. Examples of such an additional compound include a silicone-based leveling agent such as polydimethylsiloxane, methylphenylsiloxane, or organo-modified siloxane; a straight chain polymer such as poly (alkyl acrylate) or poly (alkyl vinyl ether); a surfactant such as a fluorosurfactant or a hydrocarbon surfactant; a fluoro-based leveling agent such as tetrafluoroethylene; and a photopolymerization initiator.

Specifically, in the invention, when the rod-like compound used has a polymerizable functional group capable of being polymerized by exposure to light, a photopolymerization initiator is preferably added as the additional compound.

Examples of photopolymerization initiators that may be used in the invention include benzophenone, methyl o-benzoylbenzoate, 4,4-bis(dimethylamine)benzophenone, 4,4-bis(diethylamine)benzophenone, α-aminoacetophenone, 4,4-dichlorobenzophenone, 4-benzoyl-4-methyldiphenyl ketone, dibenzyl ketone, fluorenone, 2,2-diethoxyacetophenone, 2,2-dimethoxy-2-phenylacetophenone, 2-hydroxy-2-methylpropiophenone, p-tert-butyldichloroacetophenone, thioxanthone, 2-methylthioxanthone, 2-chlorothioxanthone, 2-isopropylthioxanthone, diethylthioxanthone, benzyl dimethyl ketal, benzylmethoxyethylacetal, benzoin methyl ether, benzoin butyl ether, anthraquinone, 2-tert-butylanthraquinone, 2-amylanthraquinone, β-chloroanthraquinone, anthrone, benzanthrone, dibenzosuberone, methyleneanthrone, 4-azidobenzylacetophenone, 2,6-bis(p-azidobenzylidene)cyclohexane, 2,6-bis(p-azidobenzylidene)-4-methylcyclohexanone, 2-phenyl-1,2-butanedione-2-(o-methoxycarbonyl)oxime, 1-phenyl-propanedione-2-(o-ethoxycarbonyl)oxime, 1,3-diphenyl-propanetrione-2-(o-ethoxycarbonyl)oxime, 1-phenyl-3-ethoxy-propanetrione-2-(o-benzoyl)oxime, Michler's ketone, 2-methyl-1[4-(methylthio)phenyl]-2-morpholinopropane-1-one, 2-benzyl-2-dimethylamino-1-(4-morpholinophenyl)-butanone, naphthalenesulfonyl chloride, quinolinesulfonyl chloride, n-phenylthioacridone, 4,4-azobisisobutyronitrile, diphenyl disulfide, benzothiazole disulfide, triphenylphosphine, camphorquinone, N1717® manufactured by ASAHI DENKA CO., LTD., carbon tetrabromide, tribromophenylsulfone, benzoin peroxide, and a combination of a photo-reducible dye such as eosin or methylene blue and a reducing agent such as ascorbic acid or triethanolamine.

In the invention, these photopolymerization initiators may be used singly or in combination of two or more thereof.

In the invention, the photopolymerization initiator is preferably used in combination with a photopolymerization initiator aid. Examples of photopolymerization initiator aids that may be used in the invention include, but are not limited to, tertiary amines such as triethanolamine and methyldiethanolamine; and benzoic acid derivatives such as 2-dimethylaminoethyl benzoate and ethyl 4-dimethylamidobenzoate.

When the photopolymerization initiator is added to the retardation layer for use in the invention, the content of the photopolymerization initiator is generally preferably from 1 to 10 parts by weight, particularly preferably from 3 to 6 parts by weight, based on 100 parts by weight of the rod-like compound, while it is not restricted as long as it is in a range where the rod-like compound can be polymerized in a desired time.

Any of the compounds shown below may also be added to the retardation layer for use in the invention, as long as the objects of the invention are not hindered. Examples of compounds that may be added include polyester (meth)acrylates obtained by the reaction of (meth)acrylic acid with a polyester prepolymer obtained by the condensation of a polyhydric alcohol with a monobasic or polybasic acid; polyurethane (meth)acrylates obtained by allowing compounds having a polyol group and two isocyanate groups to react with each other and then allowing the reaction product to react with (meth)acrylic acid; photo-polymerizable compounds such as epoxy (meth)acrylates obtained by allowing (meth)acrylic acid to react with epoxy resins such as bisphenol A epoxy resins, bisphenol F epoxy resins, novolac epoxy resins, polyglycidyl esters of polycarboxylic acids, polyol polyglycidyl ethers, aliphatic or alicyclic epoxy resins, amino-epoxy resins, triphenolmethane type epoxy resins, or dihydroxybenzene type epoxy resins; and photo-polymerizable liquid crystalline compounds having an acrylic or methacrylic group. The retardation layer for use in the invention may have increased mechanical strength or improved stability, when it contains any of such compounds.

The thickness of the retardation layer for use in the invention is not restricted as long as it is in a range where the optical properties of the retardation film for use in the invention can be kept at a desired level depending on the type of the rod-like compound or the substrate described below. Specifically, in the invention, the thickness of the retardation layer is preferably in the range of 0.5 μm to 20 μm.

(2) Substrate

Next, an explanation is given on the substrate for use in the invention. The substrate for use in the invention is made of a cellulose derivative. The cellulose derivative for use in the invention may be of any type capable of imparting the desired optical properties to the retardation film. Specifically, the cellulose derivative which is preferably used in the invention include cellulose esters, specifically, cellulose acylates. Cellulose acylates are widely used in industry and therefore advantageous because they are easily available.

In the invention, an ester of a lower fatty acid of 2 to 4 carbon atoms is preferably used among the cellulose acylates. The lower fatty acid ester may include only a single lower fatty acid ester such as cellulose acetate or plural fatty acid esters such as cellulose acetate butyrate or cellulose acetate propionate.

In the invention, cellulose acetate is particularly preferably used among the lower fatty acid esters. Triacetylcellulose with an average degree of acetification of 57.5 to 62.5% (2.6 to 3.0 in substitution degree) is most preferably used as the cellulose acetate. The molecular structure of triacetylcellulose has a relatively bulky side chain. Therefore, when the substrate is made of triacetylcellulose with such an average degree of acetification, the rod-like compound in the retardation layer can be easily infiltrated into the substrate, so that the adhesion between the substrate and the retardation layer can be improved.

As used herein, the degree of acetification means the content of bonded acetic acid per unit mass of cellulose. The degree of acetification may be determined by the measurement and the calculation according to ASTM: D-817-91 (methods for testing cellulose acetate and the like).

The substrate for use in the invention preferably has a transmittance of 80% or more, more preferably 90% or more, in the visible light range. If the transmittance is too low, the range of choice of the rod-like compound and the like may be narrowed.

The transmittance of the substrate may be measured according to JIS K7361-1 (methods for testing the total light transmittance of plastic-transparent materials).

The substrate for use in the invention may have any thickness in a range where necessary self-supportability can be imparted to the retardation film. Specifically, the substrate for use in the invention preferably has a thickness of 10 μm to 188 μm, more preferably 20 μm to 125 μm, particularly preferably 30 μm to 100 μm. If the substrate has a thickness of less than the range, it may be impossible to impart necessary self-supportability to the retardation film for use in the invention. If the thickness is more than the range, the process of cutting and working the liquid crystal display polarizing plate of the invention may suffer from an increase in machining dust or early abrasion of the cutter edge.

(3) Retardation Film

The retardation film for use in the invention includes the substrate and the retardation layer formed directly on the substrate. As used herein, the term "formed directly on" means that the substrate and the retardation layer are provided with no any other layer (such as an alignment layer) interposed therebetween so that the substrate is in direct contact with the retardation layer. The invention has the advantage that the adhesion between the retardation layer and the substrate is improved, because the retardation layer is formed directly on the substrate as described above.

In the invention, the retardation layer may be formed to be in contact with the substrate in such a manner that the substrate and the retardation layer are laminated with a clear interface formed therebetween or in such a manner that the substrate and the retardation layer are laminated with no clear interface therebetween so that the concentration of the rod-like compound is continuously changed.

The in-plane retardation (Re) of the retardation film for use in the invention may be appropriately determined depending on the type or the like of the liquid crystal display for which the liquid crystal display polarizing plate of the invention may be used. Specifically, in the invention, the in-plane retardation (Re) of the retardation film is preferably in the range of 0 nm to 200 nm, particularly preferably 0 nm to 100 nm, and more preferably 0 nm to 50 nm.

The thickness direction retardation (Rth) of the retardation film for use in the invention may also be appropriately determined depending on the type or the like of the liquid crystal display for which the liquid crystal display polarizing plate of the invention may be used. Specifically, in the invention, the thickness direction retardation (Rth) of the retardation film is preferably in the range of 0 nm to 600 nm, particularly preferably 20 nm to 500 nm, and more preferably 50 nm to 400 nm.

The in-plane retardation (Re) and thickness direction retardation (Rth) of the retardation film for use in the invention preferably shows a coefficient of variation of 10% or less, more preferably 7% or less, and even more preferably 5% or less, after storage at 80° C. for 2000 hours.

2. Polarizer

Next, an explanation is given on the polarizer for use in the invention. The polarizer for use in the invention has the function of imparting polarizing properties to the liquid crystal display polarizing plate of the invention.

The polarizer for use in the invention may be of any type having the desired polarizing properties and may be any polarizer generally used in polarizing plates for liquid crystal displays. In the invention, an iodine-containing polarizer produced generally by stretching a polyvinyl alcohol film is preferably used as the polarizer.

3. Polarizing Plate Protection Film

Next, an explanation is given on the polarizing plate protection film for use in the invention. The polarizing plate protection film for use in the invention may have the function of preventing the polarizer of the liquid crystal display polarizing plate of the invention from being exposed to water in air or the like, the function of preventing dimensional change of the polarizer, or the like.

The polarizing plate protection film for use in the invention may be of any type capable of protecting the polarizer as described below and having the desired transparency. In particular, the polarizing plate protection film for use in the invention preferably has a transmittance of 80% or more, and more preferably 90% or more, in the visible light range.

The transmittance of the polarizing plate protection film may be measured according to JIS K7361-1 (methods for testing the total light transmittance of plastic-transparent materials).

Examples of materials that may be used to form the polarizing plate protection film for use in the invention include cellulose derivatives, cycloolefin resins, poly(methyl methacrylate), polyvinyl alcohol, polyimide, polyarylate, polyethylene terephthalate, polysulfone, polyether sulfone, amorphous polyolefin, modified acrylic polymers, polystyrene, epoxy resins, polycarbonate, and polyesters.

Specifically, in the invention, the resin material to be used is preferably a cellulose derivative or a cycloolefin polymer.

The cellulose derivative may be the same as that used to form the substrate for use in the retardation film described above in the section "1. Retardation Film".

On the other hand, the cycloolefin polymer for use in the invention may be any resin having a cyclic olefin (cycloolefin) monomer unit. Examples of such a cyclic olefin monomer include norbornene and polycyclic norbornene monomers.

The cycloolefin polymer for use in the invention may be preferably any of a cycloolefin polymer (COP) or a cycloolefin copolymer (COC).

The cycloolefin polymer for use in the invention may be a homopolymer or copolymer of the cyclic olefin monomer.

The cycloolefin polymer for use in the invention preferably has a saturated water absorption rate of 1% by mass or less, and particularly preferably 0.1 to 0.7% by mass, at 23° C. When such a cycloolefin polymer is used, a change in size or optical properties due to water absorption is less likely to occur in the retardation film according to the invention.

According to ASTM D570, the saturated water absorption rate may be determined by measuring an increase in weight after immersion in water at 23° C. for one week.

The cycloolefin polymer for use in the invention preferably has a glass transition point of 100° C. to 200° C., more preferably 100° C. to 180° C., and particularly preferably 100° C. to 150° C. When the glass transition point is in the above range, the retardation film for use in the invention can have a higher level of heat resistance and processability.

Specific examples of the polarizing plate protection film made of the cycloolefin resin for use in the invention include Topas® manufactured by Ticona GmbH, ARTON® manufactured by JSR Corporation, ZEONOR® manufactured by ZEON CORPORATION, ZEONEX® manufactured by ZEON CORPORATION, and APEL® manufactured by Mitsui Chemicals, Inc.

4. Liquid Crystal Display Polarizing Plate

If necessary, an additional component other than the retardation film, the polarizer, and the polarizing plate protection film may be used in the liquid crystal display polarizing plate of the invention. Such an additional component for use in the invention may be of any type as long as the advantageous effect of the liquid crystal display polarizing plate of the invention is not reduced, and any additional component capable of providing a certain function to the liquid crystal display polarizing plate of the invention may be used. For example, such an additional component may be an adhesive layer that is made of a hydrophilic adhesive and formed between the retardation film and the polarizer, and/or between the polarizing plate protection film and the polarizer. Such an adhesive layer may be formed to improve the adhesion between the retardation film and the polarizer in the liquid crystal display polarizing plate of the invention.

Figure 5:
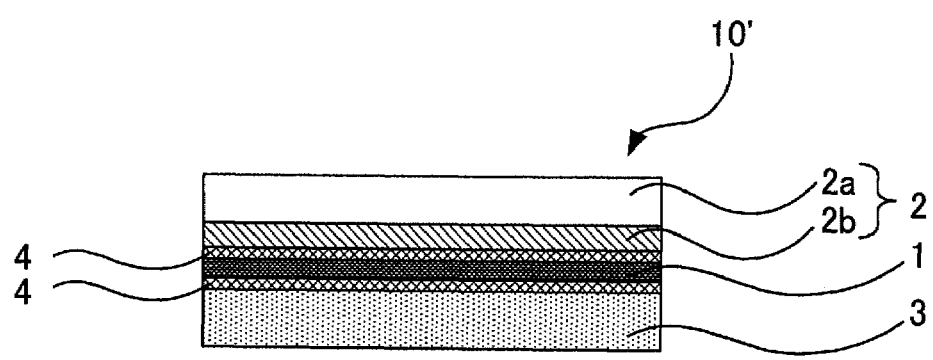
FIG. 5 is a schematic cross-sectional view showing another example of the liquid crystal display polarizing plate of the invention.

The case where the adhesive layer is formed in the liquid crystal display polarizing plate of the invention is explained with reference to the drawings. FIG. 5 is a schematic cross-sectional view showing an example of the case where the adhesive layer is formed in the liquid crystal display polarizing plate of the invention. As illustrated in FIG. 5, the liquid crystal display polarizing plate 10' of the invention may include an adhesive layer 4 that is made of a hydrophilic adhesive and formed between the retardation film 2 and the polarizer 1, and between the polarizing plate protection film 3 and the polarizer 1.

The hydrophilic adhesive used to form the adhesive layer may be of any type that can bond the retardation film and the polarizer to each other without degrading the optical properties of the retardation film. Examples of such a hydrophilic adhesive include polyvinyl alcohol and polyvinylpyrrolidone. In particular, polyvinyl alcohol is preferably used, while any of these hydrophilic adhesives may be conveniently used. As stated above, the polarizer for use in the invention is made of polyvinyl alcohol. Therefore, the polarizer and the retardation layer can be strongly bonded to each other using polyvinyl alcohol as the hydrophilic adhesive.

In the invention, only a single type of hydrophilic adhesive may be used, or two or more types of hydrophilic adhesives may be used.

The adhesive layer for use in the invention may have any thickness in a range where the polarizer and the retardation layer can be bonded with the desired adhesive strength depending on the type of the hydrophilic adhesive. Specifically, the adhesive layer for use in the invention preferably has a thickness of 5 µm to 100 µm, more preferably 10 µm to 50 µm, and even more preferably 15 µm to 30 µm.

Besides the adhesive layer, an additional component for use in the invention includes a pressure-sensitive adhesive layer which contains a pressure-sensitive adhesive and is formed on the substrate of the retardation film. When such a pressure-sensitive adhesive layer is formed, the process of producing a liquid crystal display with the liquid crystal display polarizing plate of the invention has the advantage that the liquid crystal display polarizing plate of the invention can be easily bonded to a liquid crystal cell.

Figure 6:
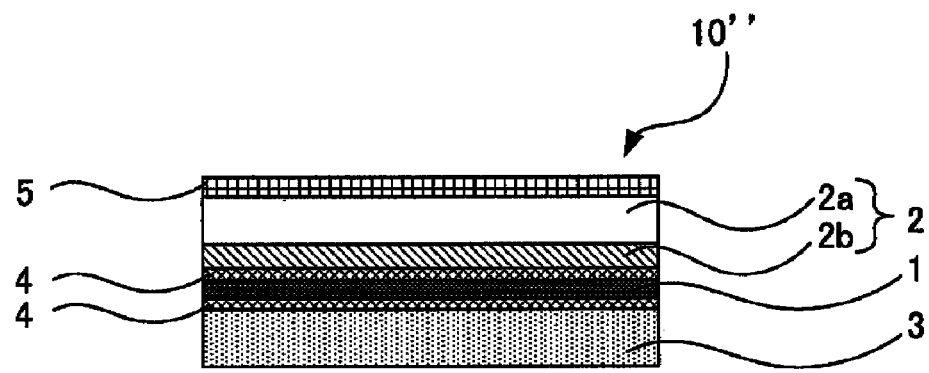
FIG. 6 is a schematic cross-sectional view showing a further example of the liquid crystal display polarizing plate of the invention.

The case where the pressure-sensitive adhesive layer is formed in the liquid crystal display polarizing plate of the invention is explained with reference to the drawings. FIG. 6 is a schematic cross-sectional view showing an example of the case where the pressure-sensitive adhesive layer is formed in the liquid crystal display polarizing plate of the invention. As illustrated in FIG. 6, the liquid crystal display polarizing plate 10" of the invention may include a pressure-sensitive adhesive layer 5 that contains a pressure-sensitive adhesive and is formed on the substrate 2a used in the retardation film 2.

The pressure-sensitive adhesive used to form the pressure-sensitive adhesive layer may be of any type that can bond the substrate and a liquid crystal cell with the desired strength. Examples of such a pressure-sensitive adhesive include an acrylic-based pressure-sensitive adhesive, a urethane-based pressure-sensitive adhesive, and an epoxy-based pressure-sensitive adhesive. In particular, an acrylic-based pressure-sensitive adhesive is preferably used, while any of these pressure-sensitive adhesives may be conveniently used.

Specific examples of an acrylic-based pressure-sensitive adhesive that may be used in the invention include a butyl acrylate-based pressure-sensitive adhesive, a polyester acrylate-based pressure-sensitive adhesive, and an epoxy acrylate-based pressure-sensitive adhesive.

In the invention, only a single type of pressure-sensitive adhesive may be used, or two or more types of pressure-sensitive adhesives may be used.

The pressure-sensitive adhesive layer for use in the invention may have any thickness in a range where the substrate and a liquid crystal cell can be bonded with the desired adhesive strength depending on the type of the pressure-sensitive adhesive. Specifically, the pressure-sensitive adhesive layer for use in the invention preferably has a thickness of 5 µm to 100 µm, more preferably 10 µm to 50 µm, and even more preferably 15 µm to 30 µm.

5. Method for Producing Liquid Crystal Display Polarizing Plate

For example, the liquid crystal display polarizing plate of the invention may be produced by the method described below in the section "B. Method for Producing Liquid Crystal Display Polarizing Plate."

B. Method for Producing Liquid Crystal Display Polarizing Plate

Next, an explanation is given on the method for producing a liquid crystal display polarizing plate of the invention. As stated above, the method for producing a liquid crystal display polarizing plate of the invention, comprising the steps of: a retardation film forming step for forming a retardation film which comprises a substrate, and a retardation layer formed on the substrate and containing a cellulose derivative and a rod-like compound, by using the substrate including the cellulose derivative and applying, directly to the substrate, a retardation layer-forming coating solution containing the rod-like compound which has refractive index anisotropy to form the retardation layer; a hydrophilic treatment step of hydrophilizing the surface of the retardation layer of the retardation film; and a polarizer bonding step of bonding a polarizer including polyvinyl alcohol to the hydrophilized retardation layer.

Figure 7A:
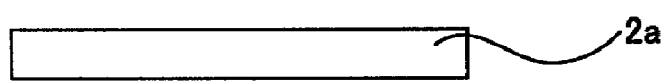
FIGS. 7A to 7D are a schematic diagram showing an example of the method for producing a liquid crystal display polarizing plate of the invention.
Figure 7B:
Figure 7C:
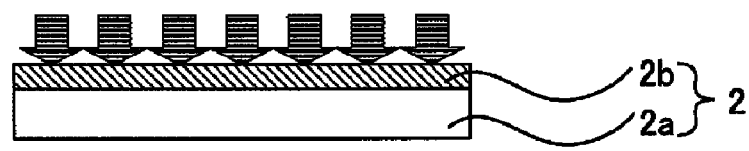
Figure 7D:
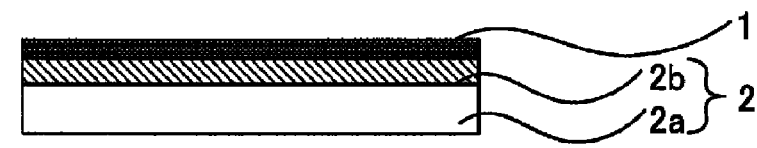

The method for producing a liquid crystal display polarizing plate of the invention is explained with reference to the drawings. FIGS. 7A to 7D are a schematic diagram showing an example of the method for producing a liquid crystal display polarizing plate of the invention. As illustrated in FIGS. 7A to 7D, the method for producing a liquid crystal display polarizing plate of the invention is characterized by comprising the steps of: a retardation film forming step (FIG. 7B) for forming a retardation film 2 which comprises a substrate 2a, and a retardation layer 2b formed on the substrate 2a and containing a cellulose derivative and a rod-like compound, by using the substrate 2a including the cellulose derivative (FIG. 7A) and applying, directly to the substrate 2a, a retardation layer-forming coating solution containing the rod-like compound which has refractive index anisotropy to form the retardation layer 2b; a hydrophilic treatment step of hydrophilizing the surface of the retardation layer 2b of the retardation film 2 (FIG. 7C); and a polarizer bonding step of bonding a polarizer 1 including polyvinyl alcohol to the hydrophilized retardation layer 2b (FIG. 7D).

According to the invention, the hydrophilic treatment step of hydrophilizing the retardation layer is followed by the step of bonding a polarizer to the hydrophilized retardation layer in the polarizer bonding step, so that the polarizer can be bonded to the retardation layer without causing degradation of the optical properties of the retardation layer. When a liquid crystal display is manufactured using the liquid crystal display polarizing plate produced according to the invention, the substrate of the retardation film and a liquid crystal cell may be bonded together with a pressure-sensitive adhesive, so that the liquid crystal display polarizing plate and the liquid crystal cell can be bonded without causing degradation of the optical properties.

According to the invention, therefore, a liquid crystal display polarizing plate that reliably exhibits the optical properties and can be bonded to a liquid crystal cell without causing degradation of the optical properties can be produced.

The method for producing a liquid crystal display polarizing plate of the invention comprises at least a retardation film producing step, a hydrophilic treatment step, and a polarizer bonding step, and may optionally comprise an additional step.

The respective steps for use in the invention are described one by one below.

1. Retardation Film Producing Step

First, an explanation is given on the retardation film producing step for use in the invention. This step is for forming a retardation film which comprises a substrate, and a retardation layer formed on the substrate and containing a cellulose derivative and a rod-like compound, by using the substrate including the cellulose derivative and applying, directly to the substrate, a retardation layer-forming coating solution containing the rod-like compound which has refractive index anisotropy to form the retardation layer.

This step is explained in detail below.

The retardation layer-forming coating solution for use in this step generally includes the rod-like compound and a solvent and may optionally include an additional compound.

The rod-like compound for use in the retardation layer-forming coating solution is the same as that described above in the section "A. Liquid Crystal Display Polarizing Plate," and therefore, a detailed description thereof is omitted here.

Any solvent capable of dissolving the rod-like compound at the desired concentration may be used for the retardation layer-forming coating solution. Examples of such a solvent include a hydrocarbon solvent such as benzene or hexane; a ketone solvent such as methyl ethyl ketone, methyl isobutyl ketone or cyclohexanone; an ether solvent such as tetrahydrofuran or 1,2-dimethoxyethane; an alkyl halide solvent such as chloroform or dichloromethane; an ester solvent such as methyl acetate, butyl acetate, or propylene glycol monomethyl ether acetate; an amide solvent such as N,N-dimethylformamide; and a sulfoxide solvent such as dimethyl sulfoxide. Among these solvents, a ketone solvent, specifically, cyclohexane is preferably used in this step.

A single solvent or a mixture of two or more solvents may be used in this step.

The content of the rod-like compound in the retardation layer-forming coating solution is not restricted, as long as it is in a range where the viscosity of the retardation layer-forming coating solution can be set to the desired level depending on the method for applying the retardation layer-forming coating solution to the substrate. Specifically, in this step, the content of the rod-like compound in the retardation layer-forming coating solution is preferably in the range of 0.1 to 60% by mass, more preferably 1 to 50% by mass, and even more preferably 10 to 40% by mass.

If necessary, the retardation layer-forming coating solution may contain a photopolymerization initiator. Examples of the photopolymerization initiator that may be used in this step include benzophenone, methyl o-benzoylbenzoate, 4,4-bis(dimethylamine)benzophenone, 4,4-bis(diethylamine)benzophenone, α-aminoacetophenone, 4,4-dichlorobenzophenone, 4-benzoyl-4-methyldiphenyl ketone, dibenzyl ketone, fluorenone, 2,2-diethoxyacetophenone, 2,2-dimethoxy-2-phenylacetophenone, 2-hydroxy-2-methylpropiophenone, p-tert-butyldichloroacetophenone, thioxanthone, 2-methylthioxanthone, 2-chlorothioxanthone, 2-isopropylthioxanthone, diethylthioxanthone, benzyl dimethyl ketal, benzylmethoxyethylacetal, benzoinmethyl ether, benzoin butyl ether, anthraquinone, 2-tert-butylanthraquinone, 2-amylanthraquinone, β-chloroanthraquinone, anthrone, benzanthrone, dibenzosuberone, methyleneanthrone, 4-azidobenzylacetophenone, 2,6-bis(p-azidobenzylidene)cyclohexane, 2,6-bis(p-azidobenzylidene)-4-methylcyclohexanone, 2-phenyl-1,2-butanedione-2-(o-methoxycarbonyl)oxime, 1-phenyl-propanedione-2-(o-ethoxycarbonyl)oxime, 1,3-diphenyl-propanetrione-2-(o-ethoxycarbonyl)oxime, 1-phenyl-3-ethoxy-propanetrione-2-(o-benzoyl)oxime, Michler's ketone, 2-methyl-1[4-(methylthio)phenyl]-2-morpholinopropane-1-one, 2-benzyl-2-dimethylamino-1-(4-morpholinophenyl)-butanone, naphthalenesulfonyl chloride, quinolinesulfonyl chloride, n-phenylthioacridone, 4,4-azobisisobutyronitrile, diphenyl disulfide, benzothiazole disulfide, triphenylphosphine, camphorquinone, N1717® manufactured by ASAHI DENKA CO., LTD., carbon tetrabromide, tribromophenylsulfone, benzoin peroxide, and a combination of a photo-reducible dye such as eosin or methylene blue and a reducing agent such as ascorbic acid or triethanolamine. In this step, these photopolymerization initiators may be used singly or in combination of two or more thereof.

The photopolymerization initiator may be used in combination with a photopolymerization initiator aid. Examples of such a photopolymerization initiator aid include, but are not limited to, tertiary amines such as triethanolamine and methyldiethanolamine; and benzoic acid derivatives such as 2-dimethylaminoethyl benzoate and ethyl 4-dimethylamidobenzoate.

The retardation layer-forming coating solution may be applied to the substrate by any method capable of achieving the desired flatness. Specific examples of such a method include, but are not limited to, gravure coating, reverse coating, knife coating, dip coating, spray coating, air knife coating, spin coating, roll coating, printing, dipping and pulling up, curtain coating, die coating, casting, bar coating, extrusion coating, and E-type coating.

The substrate for use in this step is the same as that described above in the section "A. Liquid Crystal Display Polarizing Plate," and therefore, a detailed explanation thereof is omitted here.

In general, the thickness of the coating film of the retardation layer-forming coating solution is preferably in the range of 0.1 μm to 50 μm, more preferably 0.5 μm to 30 μm, and particularly preferably 0.5 μm to 10 μm, while the coating film may have any thickness in a range where the desired flatness can be achieved. If the thickness of the coating film of the retardation layer-forming coating solution is less than the above range, the flatness of the resulting retardation layer may be degraded. If the thickness is more than the above range, the drying load of the solvent may be high so that the productivity may be reduced.

The coating film of the retardation layer-forming coating solution may be dried using a common drying method such as heat drying, reduced pressure drying, or gap drying. In the invention, a single drying method may be used, or different drying methods may be used, for example, in such a manner that the drying methods are sequentially changed according to the amount of the remaining solvent.

When the rod-like compound used is a polymerizable material, any appropriate method of polymerizing the polymerizable material may be determined depending on the type of the polymerizable functional group of the polymerizable material. In the invention, a curing method by applying an active radiation is particularly preferred. The active radiation may be any radiation capable of polymerizing the polymerizable material. Generally, in view of the simplicity of the equipment or the like, ultraviolet or visible light is preferably used. In particular, light to be applied preferably has a wavelength of 150 to 500 nm, more preferably 250 to 450 nm, and even more preferably 300 to 400 nm.

Examples of sources of the light to be applied include a low-pressure mercury lamp (a germicidal lamp, a fluorescent chemical lamp, a black light), a high-pressure discharge lamp (a high-pressure mercury lamp, a metal halide lamp), and a short-arc discharge lamp (an ultra-high pressure mercury lamp, a xenon lamp, a mercury-xenon lamp). In particular, the use of a metal halide lamp, a xenon lamp, a high-pressure mercury lamp, or the like is recommended. The irradiation intensity may be appropriately controlled depending on the content of the photopolymerization initiator or the like.

2. Hydrophilic Treatment Step

Next, an explanation is given on the hydrophilic treatment step for use in the invention. This step is a step of hydrophilizing the surface of the retardation layer of the retardation film formed in the retardation film producing step.

In this step, the surface of the retardation layer may be hydrophilized to any extent where the polarizer and the retardation layer can be bonded with the desired adhesive strength in the polarizing bonding step described below. Specifically, in this step, the surface of the retardation layer may be hydrophilized to such an extent at least that the hydrophilized surface can have a contact angle of preferably 50° or less, and more preferably 45° or less with water. In this regard, a value calculated by the θ/2 method from the result of the measurement using a contact angle meter (DM300® manufactured by Kyowa Interface Science Co., LTD.) may be used as the contact angle with water.

In this step, the surface of the retardation layer may be hydrophilized by any appropriate method that does not degrade the optical properties of the retardation layer. Examples of such a method include a method of alkali saponifying the surface of the retardation layer and a corona treatment method. In particular, the method of alkali saponifying the surface of the retardation layer is preferably used, while any of these methods may be conveniently used in this step. The retardation layer whose surface is to be hydrophilized in this step contains the rod-like compound having refractive index anisotropy and the cellulose derivative which also forms the substrate. Therefore, this step is preferably performed using a method of hydrophilizing the surface of the retardation layer, which includes alkali saponifying the surface of the retardation layer so that the cellulose derivative can be hydrolyzed. Such alkali saponification may be performed using an aqueous alkali solution. Since the rod-like compound generally has poor solubility in water, the surface of the retardation layer can be hydrophilized without causing degradation of the alignment state of the rod-like compound, when the above method is used. Therefore, the surface of the retardation layer can be hydrophilized without causing degradation of the optical properties of the retardation layer.

When alkali saponification is used as the hydrophilizing method in this step, any alkali saponification solution capable of hydrolyzing the cellulose derivative may be used. Such an alkali saponification solution may be an aqueous sodium hydroxide solution, an aqueous potassium hydroxide solution, an aqueous calcium hydroxide solution, an aqueous magnesium hydroxide solution, or the like. In particular, an aqueous sodium hydroxide solution is preferably used, while any of these alkali saponification solutions may be conveniently used.

For example, the method of subjecting the surface of the retardation layer to alkali saponification with the alkali saponification solution may be a method including applying the alkali saponification solution to the retardation layer and then washing it with water or a method including immersing the retardation film in the alkali saponification solution, then pulling it up and washing it with water.

3. Polarizer Bonding Step

Next, an explanation is given on the polarizer bonding step for use in the invention. This step is a step of bonding a polarizer including polyvinyl alcohol to the retardation layer hydrophilized in the hydrophilic treatment step.

In this step, the retardation layer and the polarizer may be bonded by any appropriate method that does not degrade the optical properties of the retardation layer. For example, such a method may be a method including applying water to the polarizer and then bonding it to the retardation layer, a method including placing the polarizer under high humidity and bonding it to the retardation layer, or a method including bonding the polarizer to the retardation layer with a hydrophilic adhesive interposed therebetween. In this step, the method of bonding the polarizer to the retardation layer with a hydrophilic adhesive interposed therebetween is preferably used. In this step, this method provides strong adhesion of the polarizer to the retardation layer.

When the hydrophilic adhesive method is used in this step, the liquid crystal display polarizing plate produced according to the invention has an adhesive layer made of the hydrophilic adhesive between the retardation layer and the polarizer.

Any hydrophilic adhesive that can bond the retardation layer and the polarizer without causing degradation of the optical properties of the retardation layer may be used in this step. Such a hydrophilic adhesive may be the hydrophilic adhesive described above in the section "A. Liquid Crystal Display Polarizing Plate", which is used to form the adhesive layer.

In this step, two or more hydrophilic adhesives may also be used.

The polarizer to be bonded to the retardation layer in this step is the same as that described above in the section "A. Liquid Crystal Display Polarizing Plate", and therefore, a detailed description thereof is omitted here.

4. Method for Producing Liquid Crystal Display Polarizing Plate

The method for producing a liquid crystal display polarizing plate of the invention comprises at least the retardation film producing step, the hydrophilic treatment step and the polarizer bonding step and may optionally comprise an additional step. An additional step that may be used in the invention includes the step of providing any additional component depending on factors such as the use of the liquid crystal display polarizing plate produced according to the invention. Examples of such a step include the step of bonding a polarizing plate protection film to the other side of the polarizer opposite to the side where the retardation film is bonded, and the step of forming a pressure-sensitive adhesive layer containing a pressure-sensitive adhesive on the substrate of the retardation film.

(1) Step of Bonding Polarizing Plate Protection Film

In the step of bonding the polarizing plate protection film, the method for bonding the polarizing plate protection film to the polarizer is not restricted, and any appropriate method which has been generally used to bond a polarizing plate protection film and a polarizer for a polarizing plate for use in a liquid crystal display may be used depending on the type of the polarizing plate protection film or the like. Examples of such a method include a method of bonding them with a pressure-sensitive adhesive interposed therebetween and a method including hydrophilizing the surface of the polarizing plate protection film with an alkali saponification in the same manner as in the polarizer bonding step described above and then bonding the protection film to the polarizer.

When the step of bonding the polarizing plate protection film is used in the invention, this step is preferably performed simultaneously with the step of bonding the polarizer. Specifically, when the step of bonding the polarizing plate protection film is used, the step of bonding the polarizer and the step of bonding the polarizing plate protection film are preferably performed in such a manner that the surfaces of the polarizer can be simultaneously bonded to the retardation film and the polarizing plate protection film, respectively. If the step of bonding the polarizer and the step of bonding the polarizing plate protection film are performed at different times, the polarizer may curl or warp after the first bonding step. However, when both steps are simultaneously performed, such deformation can be prevented.

The polarizing plate protection film used in this step is the same as that described in the section "A. Liquid Crystal Display Polarizing Plate," and therefore, a detailed description thereof is omitted here.

(2) Step of Forming Pressure-Sensitive Adhesive Layer

In the step of forming a pressure-sensitive adhesive layer, the pressure-sensitive adhesive layer may be formed by any method capable of forming a pressure-sensitive adhesive layer with the desired thickness. Examples of such a method include a method of applying to the substrate a pressure-sensitive adhesive layer-forming coating solution containing a pressure-sensitive adhesive and a method of bonding to the substrate a dry sheet containing a pressure-sensitive adhesive.

The pressure-sensitive adhesive used in this step is the same as that described above in the section "A. Liquid Crystal Display Polarizing Plate," and therefore, a detailed description thereof is omitted here.

C. Liquid Crystal Display

Next, an explanation is given on the liquid crystal display of the invention. The liquid crystal display of the invention comprises a liquid crystal cell and the liquid crystal display polarizing plate according to the invention placed on at least one side of the liquid crystal cell, wherein the liquid crystal cell and the substrate of the liquid crystal display polarizing plate are bonded together with a pressure-sensitive adhesive layer containing a pressure-sensitive adhesive.

Figure 8:
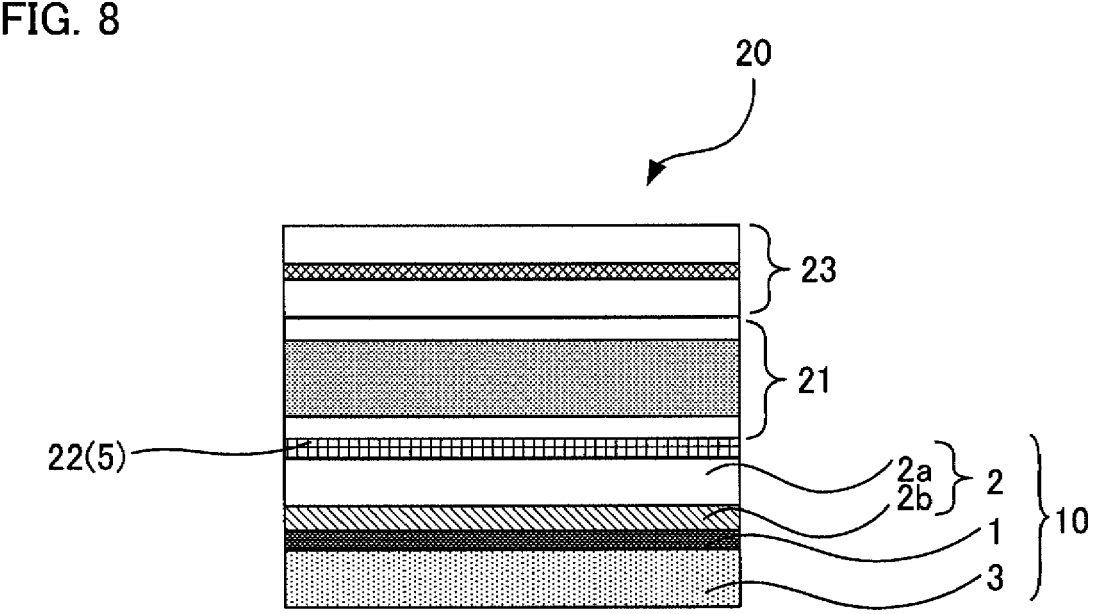
FIG. 8 is a schematic cross-sectional view showing an example of the liquid crystal display of the invention.
Figure 9:
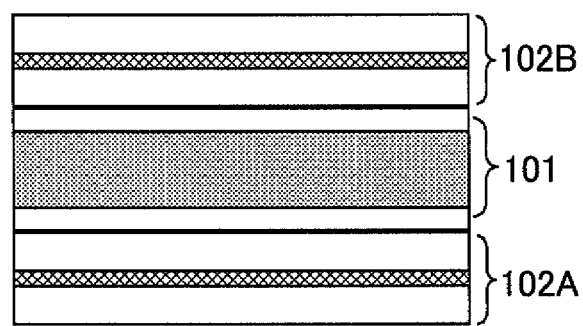
FIG. 9 is a schematic cross-sectional view showing an example of a liquid crystal display.
Figure 10:
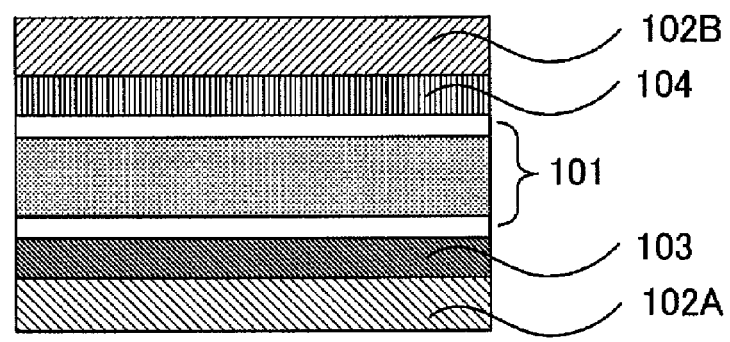
FIG. 10 is a schematic cross-sectional view showing an example of a liquid crystal display produced with a retardation film.
Figure 11:
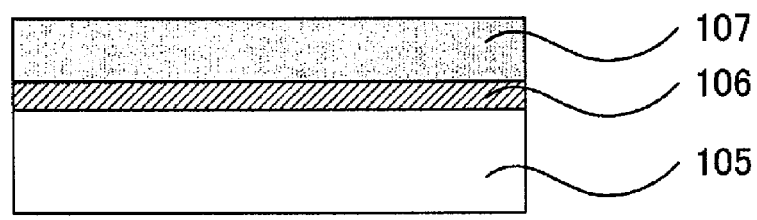
FIG. 11 is a schematic cross-sectional view showing an example of a conventional retardation film.

The liquid crystal display of the invention is described with reference to the drawings. FIG. 8 is a schematic cross-sectional view showing an example of the liquid crystal display of the invention. As illustrated in FIG. 8, the liquid crystal display 20 of the invention comprises a liquid crystal cell 21 and the liquid crystal display polarizing plate 10 according to the invention placed on at least one side of the liquid crystal cell 21, wherein the liquid crystal cell 21 and the substrate 2a of the liquid crystal display polarizing plate 10 are bonded together with a pressure-sensitive adhesive layer 22 (5) containing a pressure-sensitive adhesive.

As illustrated in FIG. 8, the liquid crystal display of the invention may generally comprise a general polarizing plate 23 placed on the other side of the liquid crystal cell 21 opposite to the side where the liquid crystal display polarizing plate 10 is bonded.

According to the invention, the substrate side of the liquid crystal display polarizing plate of the invention is bonded to the liquid crystal cell. In the process of manufacturing the liquid crystal display of the invention, therefore, the liquid crystal display polarizing plate and the liquid crystal cell can be bonded without causing degradation of the optical properties of the retardation film. According to the invention, therefore, the optical properties of the carefully designed retardation film are preserved in the process of bonding the liquid crystal display polarizing plate to the liquid crystal cell, so that a liquid crystal display with excellent viewing angle characteristics is obtained.

The liquid crystal display of the invention comprises at least a liquid crystal cell, a liquid crystal display polarizing plate, and a pressure-sensitive adhesive layer, and may optionally comprise an additional component.

The respective components that may be used in the invention are explained one by one below.

The liquid crystal display polarizing plate and the pressure-sensitive adhesive layer for use in the invention are the same as those described above in the section "A. Liquid Crystal Display Polarizing Plate," and therefore, a detailed description thereof is omitted here.

The liquid crystal cell for use in the invention may be a known liquid crystal cell that has generally been used in liquid crystal displays. Such a liquid crystal cell is well known, and therefore, a detailed description thereof is omitted here.

The liquid crystal display of the invention may generally comprise another polarizing plate placed on the other side of the liquid crystal cell opposite to the side where the liquid crystal display polarizing plate is bonded. Such a polarizing plate for use in the invention may be a known polarizing plate that has generally been used in liquid crystal displays or may be the liquid crystal display polarizing plate according to the invention.

The liquid crystal display of the invention may be produced by bonding the liquid crystal cell to the liquid crystal display polarizing plate with the pressure-sensitive adhesive layer interposed therebetween. When the liquid crystal display polarizing plate has the pressure-sensitive adhesive layer, the liquid crystal display of the invention may be produced by bonding the liquid crystal display polarizing plate directly to the liquid crystal cell.

The embodiments described above are not intended to limit the scope of the invention. It will be understood that the above embodiments are only illustrative and any variations having substantially the same feature and producing substantially the same effect as the technical idea stated in the claims fall within the scope of the invention.

EXAMPLES

Example 1

1. Preparation of Retardation Film

A retardation layer-forming coating solution having the composition shown below was applied to an 80 μm thick TAC film (trade name: TF80UL®, manufactured by Fujifilm Corporation) as a substrate. The coating was then heated at 40° C. for 2 minutes, so that the solvent was removed to dryness. The coating surface was then irradiated with ultraviolet light, so that the polymerizable liquid crystal material was fixed to form a retardation film. In this process, the retardation layer-forming coating solution was applied directly to the substrate, so that the triacetylcellulose of the TAC film was incorporated into the resulting retardation layer.

<Composition of Retardation Layer-Forming Coating solution (Example 1)>

| | |
|---|---|
| Polymerizable rod-like liquid crystal material (formula I below) | 15 parts by weight |
| Photopolymerization initiator (Irg 189 ®, manufactured by Ciba Specialty Chemicals Inc.) | 4 parts by weight |
| Reaction inhibitor (trade name: BHT ®, manufactured by KANTO KAGAKU) | 0.1 part by weight |
| Cyolohexanone | 85 parts by weight |

[Chemical Formula 3]

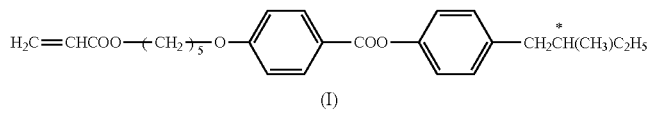

(I)

2. Saponification

The resulting retardation film was immersed in an aqueous 1.5 mol/l sodium hydroxide solution at 45° C. for 2 minutes so that it was saponified. The film was washed with distilled water and then dried at 100° C. for 1 minute. The contact angle of water on the retardation layer was measured to be 35°.

3. Preparation of Polarizing Plate

An 80 μm thick TAC film (trade name: TF80UL®, manufactured by Fujifilm Corporation) was used as a polarizer protection film. The polarizer protection film was saponified under the same conditions as described above. Iodine was adsorbed on a stretched polyvinyl alcohol film, so that a polarizer was obtained. The retardation layer of the retardation film was laminated on one side of the polarizer, and the polarizer protection film was laminated on the other side of the polarizer. A pressure-sensitive adhesive layer (trade name: CS9621 manufactured by NITTO DENKO CORPORATION) was formed on the retardation film side of the resulting polarizing plate and then bonded to a non-alkali glass plate (manufactured by Central Glass Co., Ltd.).

4. Measurement of Peel Strength

The retardation film did not peel from the polarizing plate 24 hours after the preparation of the polarizing plate.

5. Reliability Test

The sample was allowed to stand in a dry environment at 100° C. for 72 hours, then taken out and measured for retardation. A polarization/retardation analysis/measurement system (AxoScan®, manufactured by Axometrics, Inc.) was used to measure the retardation. As a result, the retardation of the retardation layer decreased by about 1 nm.

The sample was allowed to stand in a dry environment at 80° C. for 2,000 hours, then taken out and measured for retardation. As a result, the retardation of the retardation layer decreased by about 3 nm.

Comparative Example 1

A polarizing plate was prepared using the process of Example 1, except that the polarizer protection film, the polarizer, the substrate, and the retardation layer were laminated in this order to form the polarizing plate. At this time, the contact angle of water on the substrate was 18°.

The sample was allowed to stand in a dry environment at 100° C. for 72 hours, then taken out and measured for retardation. As a result, the retardation decreased by about 60 nm. The sample was also allowed to stand in a dry environment at 80° C. for 2,000 hours, then taken out and measured for retardation. As a result, the retardation of the retardation layer decreased by about 65 nm.

Comparative Example 2

An alignment film-forming coating liquid having the composition shown below was applied to an 80 μM thick TAC film (trade name: TF80UL®, manufactured by Fujifilm Corporation) as a substrate. The coating was then dried to form a 0.2 μm thick alignment film. A retardation layer-forming coating solution having the composition shown below was applied to the alignment film prepared by the above process and then heated so that the liquid crystal could be aligned. The coating was then irradiated with ultraviolet light, so that a 2.0 μm thick liquid crystal layer was formed and that a retardation film was obtained. The contact angle of water on the retardation layer was 67°.

| <Composition of Alignment Film-Forming Coating Liquid> | |
|---|---|
| Hydroxyethyl cellulose (manufactured by DAICEL CHEMICAL INDUSTRIES, LTD.) | 1 part by weight |
| Methanol | 33 parts by weight |
| Water | 66 parts by weight |

| <Composition of Retardation Layer-Forming Coating solution (Comparative Example 2)> | |
|---|---|
| Polymerizable discotic liquid crystal material (formula (II) below) | 15 parts by weight |
| Reaction initiator (trade name: Irg 907 ®, manufactured by Ciba Specialty Chemicals Inc.) | 0.8 part by weight |
| Reaction inhibitor (trade name: BHT ®, manufactured by KANTO KAGAKU) | 0.004 part by weight |
| Cyclohexanone | 72 parts by weight |
| Isopropyl alcohol | 13 parts by weight |

[Chemical Formula 4]

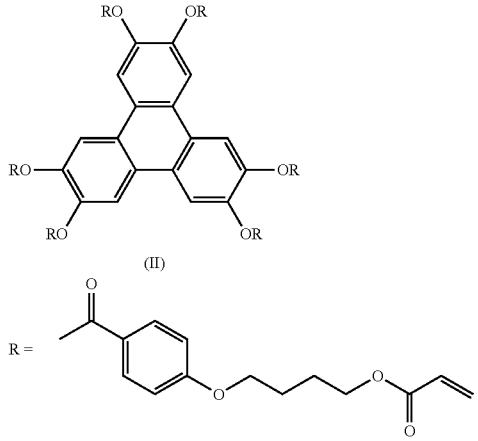

The resulting retardation film was saponified by the same method as that in Example 1. As a result, the contact angle of water on the retardation layer was 67°.

A polarizing plate was then prepared using the process of Example 1. As a result, the retardation film peeled from the polarizing plate 24 hours after the preparation of the polarizing plate.

Example 2

1. Preparation of Retardation Film

A retardation layer-forming coating solution having the composition shown below was applied to a 40 μm thick TAC film (trade name: KC4UYW®, manufactured by Konica Minolta Holdings, Inc.) as a substrate. The coating was then heated at 40° C. for 2 minutes, so that the solvent was removed to dryness. The coating surface was then irradiated with ultraviolet light at 100 mJ/cm$^2$ under a nitrogen atmosphere, so that the polymerizable liquid crystal material was fixed to form a retardation film.

| <Composition of Retardation Layer-Forming Coating solution (Example 2)> | |
|---|---|
| Polymerizable liquid crystal material (formula III below) | 20 parts by weight |
| Photopolymerization initiator (Lucirin TPO ®, manufactured by BASF Japan Ltd.) | 4 parts by weight |
| Reaction inhibitor (trade name: BHT ®, manufactured by KANTO KAGAKU) | 0.06 parts by weight |
| Cyclohexanone | 80 parts by weight |

[Chemical Formula 5]

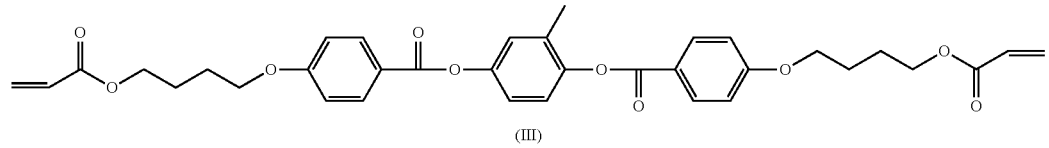

(III)

2. Saponification

The resulting retardation film was immersed in an aqueous 1.5 mol/L sodium hydroxide solution at 45° C. for 2 minutes so that it was saponified. The film was washed with distilled water and then dried at 100° C. for 1 minute. The contact angle of water on the retardation layer was measured to be 35°.

3. Preparation of Polarizing Plate

A 40 μm thick TAC film (trade name: KC4UYW®, manufactured by Konica Minolta Holdings, Inc.) was used as a polarizer protection film. The polarizer protection film was saponified under the same conditions as described above. Iodine was adsorbed on a stretched polyvinyl alcohol film, so that a polarizer was obtained. The retardation layer of the retardation film was laminated on one side of the polarizer, and the polarizer protection film was laminated on the other side of the polarizer. A pressure-sensitive adhesive layer (trade name: CS9621®, manufactured by NITTO DENKO CORPORATION) was formed on the retardation film side of the resulting polarizing plate and then bonded to a non-alkali glass plate (manufactured by Central Glass Co., Ltd.).

4. Measurement of Peel Strength

The retardation film did not peel from the polarizing plate 24 hours after the preparation of the polarizing plate.

5. Reliability Test

The sample was allowed to stand in a dry environment at 100° C. for 72 hours, then taken out and measured for retardation. A polarization/retardation analysis/measurement system (AxoScan®, manufactured by Axometrics, Inc.) was used to measure the retardation. As a result, the retardation of the retardation layer decreased by about 2 nm.

The sample was allowed to stand in a dry environment at 80° C. for 2,000 hours, then taken out and measured for retardation. As a result, the retardation of the retardation layer decreased by about 2 nm.

The invention claimed is:

1. A liquid crystal display polarizing plate, comprising:
   a retardation film which further comprises a substrate including a cellulose derivative and a retardation layer formed directly on the substrate and containing the cellulose derivative and a rod-like compound having refractive index anisotropy;
   a polarizer bonded to the retardation layer of the retardation film and including polyvinyl alcohol; and
   a polarizing plate protection film bonded to the polarizer.

2. The liquid crystal display polarizing plate according to claim 1, further comprising an adhesive layer which includes a hydrophilic adhesive and is formed between the retardation film and the polarizer.

3. The liquid crystal display polarizing plate according to claim 1, further comprising a pressure-sensitive adhesive layer which contains an acrylic pressure-sensitive adhesive and is formed on the substrate of the retardation film.

4. The liquid crystal display polarizing plate according to claim 1, wherein the rod-like compound is in random homogeneous alignment.

5. A method for producing a liquid crystal display polarizing plate, comprising the steps of:
   a retardation film forming step for forming a retardation film which comprises a substrate, and a retardation layer formed on the substrate and containing a cellulose derivative and a rod-like compound, by using the substrate including the cellulose derivative and applying, directly to the substrate, a retardation layer-forming coating solution containing the rod-like compound which has refractive index anisotropy to form the retardation layer;
   a hydrophilic treatment step of hydrophilizing a surface of the retardation layer of the retardation film; and
   a polarizer bonding step of bonding a polarizer including polyvinyl alcohol to the hydrophilized retardation layer.

6. The method according to claim 5, wherein in the hydrophilic treatment step is a step of hydrophilizing the surface of the retardation layer by alkali saponifying the cellulose derivative contained in the retardation layer.

7. A liquid crystal display, comprising:
   a liquid crystal cell; and
   the liquid crystal display polarizing plate according to claim 1 placed on at least one side of the liquid crystal cell, wherein the liquid crystal cell and the substrate of the liquid crystal display polarizing plate are bonded together with a pressure-sensitive adhesive layer containing a pressure-sensitive adhesive.

* * * * *